(12) United States Patent
Hirota

(10) Patent No.: US 6,999,049 B2
(45) Date of Patent: Feb. 14, 2006

(54) LIQUID CRYSTAL DISPLAY DEVICE AND DRIVE METHOD THEREOF

(75) Inventor: Naoto Hirota, Toyokawa (JP)

(73) Assignee: Obayashiseikou Co., Ltd., Aichi (JP)

( * ) Notice: Subject to any disclaimer, the term of this patent is extended or adjusted under 35 U.S.C. 154(b) by 354 days.

(21) Appl. No.: 10/117,754

(22) Filed: Apr. 5, 2002

(65) Prior Publication Data

US 2002/0158826 A1   Oct. 31, 2002

(30) Foreign Application Priority Data

Apr. 7, 2001   (JP)   ............................. 2001-157925

(51) Int. Cl.
*G09G 3/36*   (2006.01)

(52) U.S. Cl. .................. 345/87; 345/95; 345/103; 315/169.1

(58) Field of Classification Search .................. 345/87, 345/88, 89, 90, 105, 95, 98, 100, 210, 103; 349/149, 151, 41; 368/242; 315/169.1, 315/169.3

See application file for complete search history.

(56) References Cited

U.S. PATENT DOCUMENTS

| | | | |
|---|---|---|---|
| 5,598,285 A | | 1/1997 | Kondo et al. |
| 5,745,207 A | | 4/1998 | Asada et al. |
| 6,067,066 A | * | 5/2000 | Kubota et al. ................ 345/98 |
| 6,122,465 A | * | 9/2000 | Hiyama et al. ............. 399/106 |
| 6,407,508 B1 | * | 6/2002 | Kawada et al. .......... 315/169.3 |
| 6,531,997 B1 | * | 3/2003 | Gates et al. ................ 345/107 |
| 6,570,638 B1 | * | 5/2003 | Song .......................... 349/143 |
| 6,618,112 B1 | * | 9/2003 | Yoshimura et al. ......... 349/155 |

FOREIGN PATENT DOCUMENTS

| KR | 1999-74686 | 10/1999 |
|---|---|---|
| KR | 100251655 | 1/2000 |
| KR | 100262405 | 5/2000 |

\* cited by examiner

*Primary Examiner*—Amr A. Awad
*Assistant Examiner*—Abbas Abdulselam
(74) *Attorney, Agent, or Firm*—Muramatsu & Associates

(57) ABSTRACT

An active matrix liquid crystal display device with a transverse electric field type with low power and cost as well as improved display quality such as a large visual field angle and high contrast and brightness. The active matrix type liquid crystal display device of a transverse electric field system is comprised of two common electrodes running in parallel with one another in each pixel wherein the common electrodes are separated from one another and respectively provided with different voltages. One of the common electrodes is established adjacent to a scanning line and the two common electrodes are in parallel with each other with a predetermined distance, and either one of the two common electrodes is established in parallel with a liquid crystal drive electrode

23 Claims, 26 Drawing Sheets

LIQUID CRYSTAL DISPLAY DEVICE AND DRIVE METHOD THEREOF

BACKGROUND OF THE INVENTION

1. Field of the Invention

The present invention relates to a liquid crystal display device with a transverse electric field type, and more particularly, to a large screen active matrix liquid crystal display device with low power and cost as well as improved display quality such as a large visual field angle and high contrast and brightness.

2. Description of the Related Art

With the use of a pair of comb-like electrodes formed on one of the substrates, an active matrix liquid crystal display device in a transverse electric field system is achieved where an electric field is applied to a liquid crystal composition layer on the substrate in a horizontal direction. Such a technology has been proposed, for example, in Japanese Laid-Open Patent Publication Nos. 7-36058 and 7-159786. FIGS. 1 and 8 are plan views of the conventional liquid crystal display device in the transverse electric field system.

In the example of FIGS. 1 and 8, each pixel includes a pixel electrode which is formed of a pair of a common electrode 3 and a liquid crystal drive electrode 6 for driving the liquid crystal and a scanning line 1. FIG. 2 shows a drive signal waveform for driving the liquid crystal display panel in the conventional transverse electric field system. The voltage of the common electrode (Vcom) is constant, and with reference to the common electrode voltage (Vcom) as a center, a video signal 8 changes its polarity at every horizontal scanning cycle.

As shown in FIGS. 1 and 8, when improving an aperture ratio of the liquid crystal panel as well as the transmission of a backlight therethrough, a distance between a common electrode 3 and a liquid crystal drive electrode 6 in each pixel has to be increased. When the distance between the two electrodes becomes large, a voltage for driving the liquid crystal needs to be increased to accommodate the distance. In the conventional drive method where the constant common electrode voltage (Vcom) is used, the amplitude (VDH+VDL) of the video signal voltage applied to a video signal line 2 needs to be increased to about 20V (volts). In this situation, the maximum voltage amplitude (VGH+VGL) of a scanning signal 7 applied to the scanning line 1 is about 50V. Further, due to the increase in these drive voltages, the cost of a driver IC has to be significantly increased.

Moreover, the increase in the drive voltages tends to increase short circuits in the scanning lines 1 and the video signal lines 2. Also, when the signal voltage of video signal line 2 increases, the shielding effect of the common electrode 3 declines, resulting in vertical cross talks. The voltage increase further leads to the increase in the electric field applied between the pixel electrode (common electrode and liquid crystal drive electrode) and a transparent electrode which is formed on the entire backside of a color filter substrate, allowing ions to move into the liquid crystal layer. Such ions cause problems such as residual images, resulting in serious deterioration in the display quality.

SUMMARY OF THE INVENTION

It is, therefore, an object of the present invention to solve the above noted problems and provide a large screen liquid crystal display panel in a transverse electric field system with high production yield and low cost.

It is another object of the present invention to provide a large screen active matrix type liquid crystal display device with high display quality including improved visual field angle and higher brightness.

It is a further object of the present invention to provide a large screen active matrix type liquid crystal display device with improved display quality by reducing cross talks in the pixels.

It is a further object of the present invention to provide a large screen active matrix type liquid crystal display device with reduced color shift by bending the signal line, pixel electrodes, etc.

In order to achieve this object, in the first aspect of the present invention, the active matrix type liquid crystal display device of a transverse electric field system is comprised of two common electrodes running in parallel with one another in each pixel wherein the common electrodes are separated from one another and respectively provided with different voltages.

The second aspect of the present invention is the active matrix type liquid crystal display device which further specifies the first aspect of the present invention. In the second aspect, the voltages supplied to the two common electrodes are alternately switched with one another between the two electrodes at every horizontal scanning period or vertical scanning period.

The third aspect of the present invention is the active matrix type liquid crystal display device which further specifies the first aspect of the present invention. In the third aspect, the liquid crystal display device further includes a video signal line for supplying a drive signal that drives the pixel, and a scanning line aligned to cross the video signal line, wherein the video signal line and the scanning line are aligned in a matrix manner. The pixel is aligned in a matrix manner corresponding to the matrix formed by the video signal line and the scanning line and includes the common electrodes and the liquid crystal drive electrode connected to the video signal line, and one of the common electrode is established adjacent to the scanning line and the two common electrode are in parallel with each other with a predetermined distance, and either one of the two common electrodes is established in parallel with the liquid crystal drive electrode.

According to the active matrix type liquid crystal display device in the third aspect of the present invention, one of the two common electrodes is established along the scanning line, and the two common electrodes are established in parallel with each other at a predetermined distance. Either one of the two common electrodes is also established in parallel with the liquid crystal drive electrode. The liquid crystal drive electrode is connected to the video signal line, and when signals are supplied to the pixel from the video signal line and the scanning line, a voltage difference is produced between the liquid crystal drive electrode and one of the common electrodes established along the liquid crystal drive electrodes, thereby driving the liquid crystal in the pixel.

The fourth aspect of the present invention is the active matrix type liquid crystal display device which further specifies the third aspect of the present invention. In the fourth aspect, the voltages supplied to the two common electrodes are alternately switched with one another between the two electrodes at every horizontal scanning period or vertical scanning period.

The fifth aspect of the present invention is the active matrix type liquid crystal display device which further specifies the fourth aspect of the present invention. In the fifth aspect, an average voltage of the voltages supplied to the common electrodes or an average voltage of the signal amplitude supplied to the video signal line is set to an earth voltage or a positive voltage slightly higher than the earth voltage. Here, the positive voltage close to the earth voltage is in a range between about 0V and +1V.

The sixth aspect of the present invention is the active matrix type liquid crystal display device which further specifies the third aspect of the present invention. In the sixth aspect, each of the two common electrodes is established along both sides of the scanning line with the voltages of the two common electrodes being different from one another. The common electrode voltages are switched with one another between the two common electrodes at every cycle of a horizontal scanning period or a vertical scanning period.

The seventh aspect of the present invention is the active matrix type liquid crystal display device which further specifies the third aspect of the present invention. In the seventh aspect, the common electrodes are extended along the scanning line and are diverted perpendicularly relative to the alignment direction of the scanning line and are formed in parallel with the liquid crystal drive electrodes. The diverted common electrodes are respectively based on different common electrodes provided with different voltages and are established adjacent to both sides of the video signal line.

The eighth aspect of the present invention is the active matrix type liquid crystal display device which further specifies the third aspect of the present invention. In the eighth aspect, the liquid crystal drive electrode and the common electrodes established in parallel with the liquid crystal drive electrode are bent in a zigzag manner with two intersecting angles. One intersecting angle is in a range between +1° and +30° relative to the alignment direction of liquid crystal and another intersecting angle is in a range between −1° and −30° relative to the alignment direction of the liquid crystal.

The ninth aspect of the present invention is the active matrix type liquid crystal display device which further specifies the eighth aspect of the present invention. In the ninth aspect, the video signal line is bent in a zigzag manner with two intersecting angles. One intersecting angle is in a range between +1° and +30° relative to the alignment direction of a liquid crystal and another intersecting angle is in a range between −1° and −30° relative to the alignment direction of the liquid crystal. The liquid crystal display device further comprises at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

According to the active matrix type liquid crystal display device in the ninth aspect of the present invention, the video signal line is formed in a zigzag manner with two intersecting angles, and either the color filter or the black mask is provided which has the intersecting angles equal to the intersecting angles above. Accordingly, at least one of the color filter or the black mask is aligned in the zigzag manner relative to the alignment direction of the liquid crystal within the angle range of ±1° and ±30°.

The tenth aspect of the present invention is the active matrix type liquid crystal display device which further specifies the third aspect of the present invention. In the tenth aspect, the liquid crystal drive electrode and the common electrodes established in parallel with the liquid crystal drive electrode are bent in a zigzag manner with two intersecting angles. One intersecting angle is in a range between +60° and +89° relative to the alignment direction of liquid crystal and another intersecting angle is in a range between −60° and −89° relative to the alignment direction of the liquid crystal.

The eleventh aspect of the present invention is the active matrix type liquid crystal display device which further specifies the tenth aspect of the present invention. In the eleventh aspect, the video signal line is bent in a zigzag manner with two intersecting angles where one intersecting angle is in a range between +60° and +89° relative to the alignment direction of a liquid crystal and another intersecting angle is in a range between −60° and −89° relative to the alignment direction of the liquid crystal. The liquid crystal display device further comprises at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

According to the active matrix type liquid crystal display device in the eleventh aspect of the present invention, the video signal line is formed in a zigzag manner with two intersecting angles, and either the color filter or the black mask is provided which has the intersecting angles equal to the intersecting angles above. Accordingly, at least one of the color filter or the black mask is aligned in the zigzag manner relative to the alignment direction of the liquid crystal within the angle range of ±60° and ±89°.

The twelfth aspect of the present invention is the active matrix type liquid crystal display device which further specifies the third aspect of the present invention. In the twelfth aspect, the liquid crystal display device further includes a gate insulation layer for insulating the common electrodes and the liquid crystal drive electrode within each pixel. One of the two common electrodes and the liquid crystal drive electrode are insulated from one another by the gate insulation layer while forming a hold capacitor by partially overlapping with one another having the gate insulation layer therebetween.

According to the active matrix type liquid crystal display device in the twelfth aspect of the present invention, the common electrodes and liquid crystal drive electrode are insulated by the gate insulation layer. One of the two common electrodes and the liquid crystal drive electrode are aligned to cross with one another while sandwiching the gate insulation layer therebetween, thereby forming the hold capacitor.

The thirteenth aspect of the present invention is the active matrix type liquid crystal display device which further specifies the twelfth aspect of the present invention. In the thirteenth aspect, the liquid crystal display device further includes a passivation layer in addition to the gate insulation layer for insulating the liquid crystal drive electrode and the common electrodes. The common electrodes are formed of two parallel electrodes one of which is positioned above another at a predetermined vertical distance, and the liquid crystal drive electrode insulated by the passivation layer and the gate insulation layer is sandwiched between the two parallel electrodes.

According to the active matrix type liquid crystal display device in the thirteenth aspect of the present invention, the two common electrodes are positioned in a vertical relationship with a predetermined distance, and the two common electrodes sandwich the liquid crystal drive electrode which is insulated by the passivation layer and the gate insulation layer.

The fourteenth aspect of the present invention is the active matrix type liquid crystal display device which further specifies the thirteenth aspect of the present invention. In the fourteenth aspect, the common electrodes are formed of two parallel electrodes one of which is positioned above another at a predetermined vertical distance while sandwiching the passivation layer and the gate insulation layer therebetween. The common electrodes are established on both sides of the video signal line.

The fifteenth aspect of the present invention is the active matrix type liquid crystal display device which further specifies the fourteenth aspect of the present invention. In the fifteenth aspect, the common electrodes having the two parallel electrodes at the predetermined vertical distance for sandwiching the passivation layer and the gate insulation layer between and the liquid crystal drive electrode are bent in a zigzag manner with two intersecting angles. One intersecting angle is in a range between +1° and +30° relative to the alignment direction of liquid crystal and another intersecting angle is in a range between −1° and −30° relative to the alignment direction of the liquid crystal.

The sixteenth aspect of the present invention is the active matrix type liquid crystal display device which further specifies the fifteenth aspect of the present invention. In the sixteenth aspect, the video signal line is bent in a zigzag manner with two intersecting angles where one intersecting angle is in a range between +1° and +30° relative to the alignment direction of liquid crystal and another intersecting angle is in a range between −1° and −30° relative to the alignment direction of the liquid crystal. The liquid crystal display device further comprises at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

According to the active matrix type liquid crystal display device in the sixteenth aspect of the present invention, the video signal line is formed in a zigzag manner with two intersecting angles, and either the color filter or the black mask is provided which has the intersecting angles equal to the intersecting angles above. Accordingly, at least one of the color filter or the black mask is aligned in the zigzag manner relative to the alignment direction of the liquid crystal within the angle range of ±1° and ±30°.

The seventeenth aspect of the present invention is the active matrix type liquid crystal display device which further specifies the fourteenth aspect of the present invention. In the sixteenth aspect, the common electrodes having the two parallel electrodes at the predetermined vertical distance for sandwiching the passivation layer and the gate insulation layer between and the liquid crystal drive electrode are bent in a zigzag manner with two intersecting angles. One intersecting angle is in a range between +60° and +89° relative to the alignment direction of liquid crystal and another intersecting angle is in a range between −60° and −89° relative to the alignment direction of the liquid crystal.

The eighteenth aspect of the present invention is the active matrix type liquid crystal display device which further specifies the seventeenth aspect of the present invention. In the eighteenth aspect, the video signal line is bent in a zigzag manner with two intersecting angles where one intersecting angle is in a range between +60° and +89° relative to the alignment direction of a liquid crystal and another intersecting angle is in a range between −60° and −89° relative to the alignment direction of the liquid crystal. The liquid crystal display device further comprises at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

According to the active matrix type liquid crystal display device in the eighteenth aspect of the present invention, the video signal line is formed in a zigzag manner with two intersecting angles, and either the color filter or the black mask is provided which has the intersecting angles equal to the two intersecting angles above. Accordingly, at least one of the color filter or the black mask is aligned in the zigzag manner relative to the alignment direction of the liquid crystal within the angle range of ±60° and ±89°.

The nineteenth aspect of the present invention is the active matrix type liquid crystal display device which further specifies the third aspect of the present invention. In the nineteenth aspect, the liquid crystal display device further includes a gate insulation layer for insulating the common electrodes and the liquid crystal drive electrode within each pixel. The two common electrodes and the liquid crystal drive electrode are insulated from one another by the gate insulation layer while forming two hold capacitors within a unit pixel by partially overlapping with one another having the gate insulation layer therebetween.

According to the active matrix type liquid crystal display device defined in the nineteenth aspect of the present invention, the common electrodes and liquid crystal drive electrodes are insulated by the gate insulation layer. The two common electrodes and the liquid crystal drive electrode cross with one another, thereby forming the two hold capacitors.

The twentieth aspect of the present invention is the active matrix type liquid crystal display device which further specifies the nineteenth aspect of the present invention. In the twentieth aspect, the liquid crystal display device further includes a passivation layer in addition to the gate insulation layer for insulating the liquid crystal drive electrode and the common electrodes. The common electrodes are formed of two parallel electrodes one of which is positioned above another at a predetermined vertical distance, and the liquid crystal drive electrode insulated by the passivation layer and the gate insulation layer are sandwiched between the two parallel electrodes.

According to the active matrix type liquid crystal display device in the twentieth aspect of the present invention, the two common electrodes are positioned in a vertical relationship with a predetermined distance, and the two common electrodes sandwich the liquid crystal drive electrode which is insulated by the passivation layer and the gate insulation layer.

The twenty-first aspect of the present invention is the active matrix type liquid crystal display device which further specifies the twentieth aspect of the present invention. In the twentieth aspect, the common electrodes are formed of two parallel electrodes one of which is positioned above another at a predetermined vertical distance while sandwiching the passivation layer and the gate insulation layer therebetween. The common electrodes are established on both sides of the video signal line.

The twenty-second aspect of the present invention is the active matrix type liquid crystal display device which further specifies the twenty-first aspect of the present invention. In the twenty-second aspect, the common electrodes having the two parallel electrodes at the predetermined vertical distance for sandwiching the passivation layer and the gate insulation layer therebetween and the liquid crystal drive electrode are bent in a zigzag manner with two intersecting angles. One intersecting angle is in a range between +1° and +30° relative to the alignment direction of liquid crystal and another intersecting angle is in a range between −1° and −30° relative to the alignment direction of the liquid crystal.

The twenty-third aspect of the present invention is the active matrix type liquid crystal display device which further specifies the twenty-second aspect of the present invention. In the twenty-third aspect, the video signal line is bent in a zigzag manner with two intersecting angles where one intersecting angle is in a range between +1° and +30° relative to the alignment direction of liquid crystal and another intersecting angle is in a range between −1° and −30° relative to the alignment direction of the liquid crystal. The liquid crystal display device further comprising at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

According to the active matrix type liquid crystal display device in the twenty-third aspect of the present invention, the video signal line is formed in a zigzag manner with two intersecting angles, and either the color filter or the black mask is provided which has the intersecting angles equal to the two intersecting angles above. Accordingly, at least one of the color filter or the black mask is aligned in a zigzag manner relative to the alignment direction of the liquid crystal within the angle range of ±1° and ±30°.

The twenty-fourth aspect of the present invention is the active matrix type liquid crystal display device which further specifies the twenty-first aspect of the present invention. In the twenty-fourth aspect, the common electrodes having the two parallel electrodes at the predetermined vertical distance for sandwiching the passivation layer and the gate insulation layer therebetween and the liquid crystal drive electrode are bent in a zigzag manner with two intersecting angles. One intersecting angle is in a range between +60° and +89° relative to the alignment direction of a liquid crystal and another intersecting angle is in a range between −69° and −89° relative to the alignment direction of the liquid crystal.

The twenty-fifth aspect of the present invention is the active matrix type liquid crystal display device which further specifies the twenty-fourth aspect of the present invention. In the twenty-fifth aspect, the video signal line is bent in a zigzag manner with two intersecting angles where one intersecting angle is in a range between +60° and +89° relative to the alignment direction of a liquid crystal and another intersecting angle is in a range between −60° and −89° relative to the alignment direction of the liquid crystal. The liquid crystal display device further comprising at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

According to the active matrix type liquid crystal display device in the twenty-fifth aspect of the present invention, the video signal line is formed in a zigzag manner with two intersecting angles, and either the color filter or the black mask is provided which has the intersecting angles equal to the two intersecting angles above. Accordingly, at least one of the color filter or the black mask is aligned in a zigzag manner relative to the alignment direction of the liquid crystal within the angle range of ±60° and ±89°.

In the twenty-sixth aspect of the present invention, the active matrix type liquid crystal display device of a transverse electric field system is comprised of a color filter substrate having a color filter on one surface and a transparent conductive layer on a surface opposite to the color filter, and an active matrix substrate having common electrodes on a surface facing the color filter for applying signal voltage to drive pixels. The transparent conductive layer is set to an earth potential, and an average of signal voltages applied to the common electrodes is set to the earth potential or a positive voltage closest to the earth potential.

According to the active matrix type liquid crystal display device in the twenty-sixth aspect of the present invention, the display device has the color filter substrate and the active matrix substrate. The transparent conductive layer formed on the color filter substrate is set to the earth voltage. Further, the average voltage of the common electrodes on the active matrix substrate is set to the earth voltage or the positive voltage close to the earth voltage. Here, the positive voltage close to the earth voltage is in a range between about 0V and +1V.

In the twenty-seventh aspect of the present invention, the active matrix type liquid crystal display device of a transverse electric field system is comprised of a color filter substrate having a color filter on one surface and a transparent conductive layer on a surface opposite to the color filter, and an active matrix substrate having a video signal line on a surface facing the color filter for applying signal voltage to drive pixels. The transparent conductive layer is set to an earth potential, and an average of signal voltages applied to the video signal line is set to the earth potential or a positive voltage closest to the earth potential.

According to the active matrix type liquid crystal display device in the twenty-seventh aspect of the present invention, the display device has the color filter substrate and the active matrix substrate. The transparent conductive layer formed on the color filter substrate is set to the earth voltage. Further, the average voltage of the video signal line on the active matrix substrate is set to the earth voltage or the positive voltage close to the earth voltage. Here, the positive voltage close to the earth voltage is in a range between about 0V and +1V.

With use of the active matrix type liquid crystal display device either in the first to fourth aspect of the present invention, the video signal voltage can be drastically reduced. In the present invention, the common electrode voltages are alternately changing between the two common electrodes. The voltage applied to the liquid crystal is a difference between the voltage applied to the liquid crystal drive electrode and the voltage applied to the common electrode. Thus, by setting the relationship between the two voltages to achieve a largest difference, a sufficient voltage for the liquid crystal is available with a small amplitude of the video signal voltage. For example, the amplitude of the video signal requires to the liquid crystal display panel of the present invention can be reduced to about a third (⅓) of the amplitude required in the conventional technology. As a result, an overall power consumption of a driver IC for driving the video signal line is dramatically reduced as well as possibility of cross talks can be drastically reduced. In addition, problems concerning electromagnetic noise as well as IC and module costs can also be drastically reduced.

With use of the active matrix type liquid crystal display device in the first, third of sixth aspect of the present invention, changes in the voltages on the two common electrodes can be canceled with one another, thereby enabling to prevent the fluctuation in the voltage on the scanning line.

With use of the active matrix type liquid crystal display device in the seventh, fourteenth, or twenty-first aspect of the present invention, the electric field of the video signal line can be easily shielded. Accordingly, the vertical cross talks which tend to be generated in the liquid crystal panel in the transverse electric field system can be significantly reduced.

By using the active matrix type liquid crystal display devices in the fifth, twenty-sixth, or twenty-seventh aspect of the present invention, a large DC voltage will not be applied between the pixel electrodes and the backside transparent conductive electrode, such as ITO, on the color filter substrate facing the active matrix substrate, as well as between the common electrodes and video signal line. Thus, the ionic material will not elude from the color filter substrate, achieving a liquid crystal panel with high reliability. Further, because it is able to suppress the uneven migration of the ionic material, display unevenness will no longer be generated, achieving a reliable liquid crystal display device with high display quality.

With use of the active matrix type liquid crystal display in the 8–11th, 15–18th, or 22–25th aspect of the present invention, there arise two rotating directions, for example, left rotation and right rotation, of the liquid crystal molecule in the pixel. Thus it is possible to prevent the occurrence of color shift and gray scale inversion problems, thereby achieving an excellent display quality. Further, when applying this method, a polarization axis of the polarization plate and the vertical and horizontal axis of the liquid crystal panel will match with one another, which improves availability of the polarization plate as well as reduces the cost of the polarizing plate. By bending the color filter or black mask at the same angle as the video signal line and pixel electrodes, the aperture ratio can be improved, resulting in a liquid crystal display device with higher brightness.

By using the active matrix type liquid crystal display devices defined in the twelfth, thirteenth, nineteenth or twentieth aspect of the present invention, a hold capacitor can be created which is able to suppress changes in the voltage of the liquid crystal drive electrode even if there is a large current leakage from thin film transistors. Accordingly, it is possible to achieve a liquid crystal display device with high contrast.

DETAILED DESCRIPTION OF THE INVENTION

Preferred embodiments of the present invention will be described with reference to the accompanying drawings.

Embodiment 1

Figure 3:
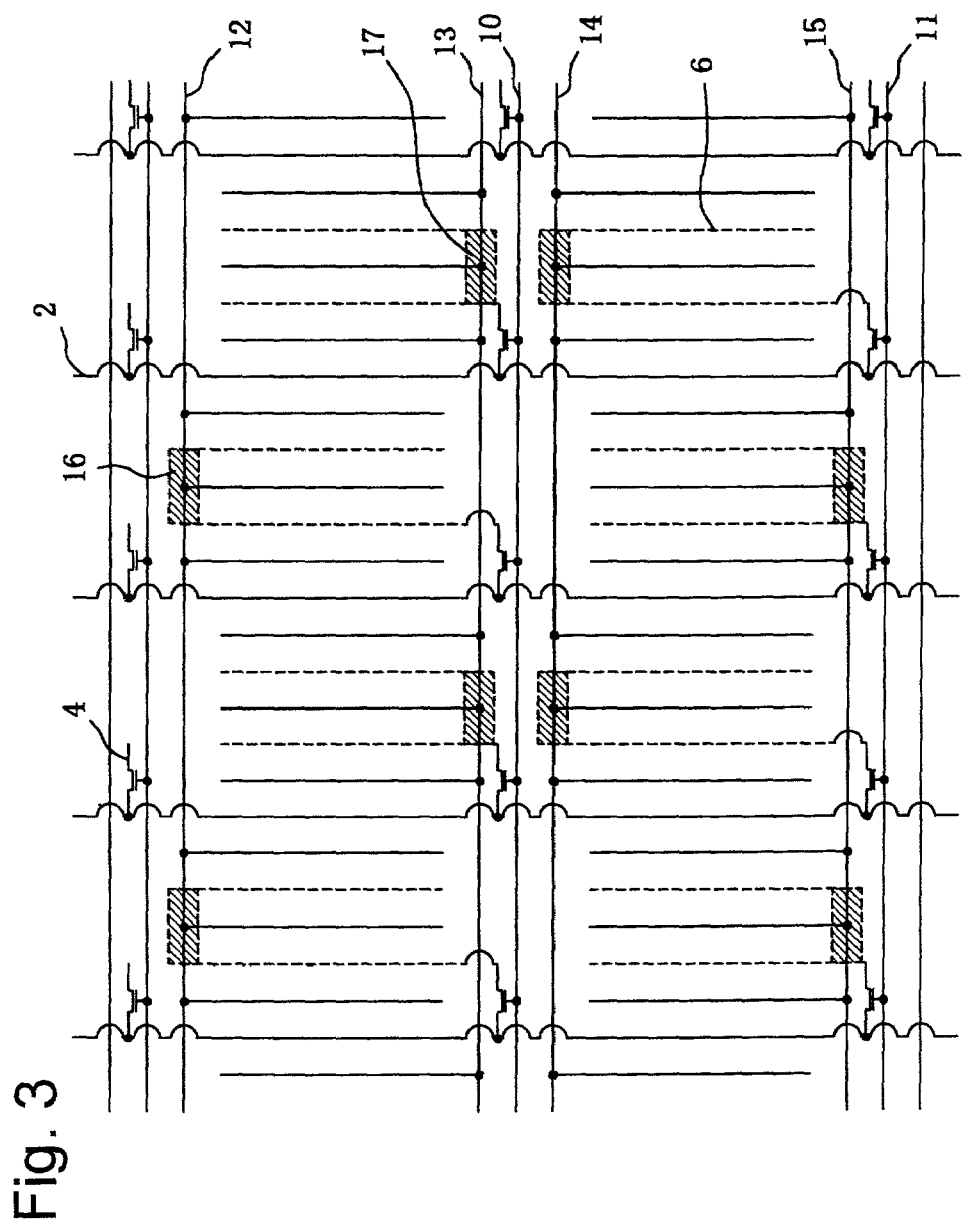
FIG. 3 is a plan view showing an example of structure in the transverse electric field type liquid crystal display panel in the first embodiment of the present invention having two common electrodes within each pixel.
Figure 11:
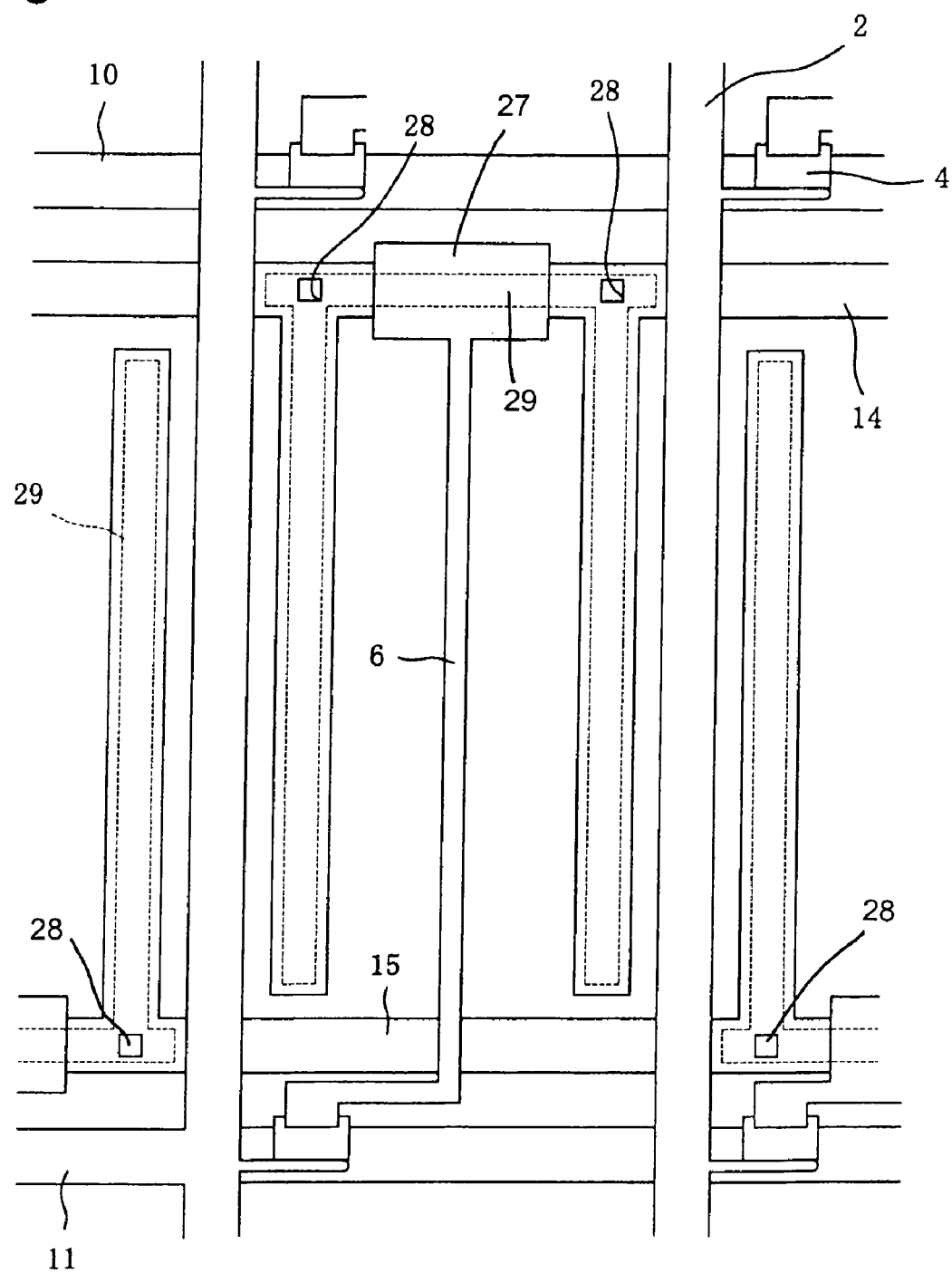
FIG. 11 is a plan view showing an example of structure in the transverse electric field type liquid crystal display panel in the first embodiment of the present invention having two common electrodes within each pixel.

FIGS. 3 and 11 are plan views of the liquid crystal display panel in the first embodiment of the present invention. As shown in the drawings, an active matrix type liquid crystal display device of the present invention includes scanning lines 10 and 11 which are parallel to each other, and video signal lines 2 which are perpendicular to the scanning lines 10 and 11. The scanning lines 10 and 11 and video signal lines 2 are formed on a glass substrate (shown in FIG. 13).

The scanning lines 10 and 11 and the video signal lines 2 are also arranged in a matrix format, where each grid denotes a unit pixel.

It should be noted that, within the context of this invention, such terms as "parallel", "perpendicular", "upward", "vertical", etc. should not be interpreted with strict and narrow meanings but be interpreted with wider meaning within the concept of this invention. For example, the word "parallel" should be interpreted as roughly or almost parallel in such a degree that two objects do not merge with one another. Similarly, the word "perpendicular" should be interpreted as "almost perpendicular", or "roughly perpendicular" or "about perpendicular".

Figure 1:
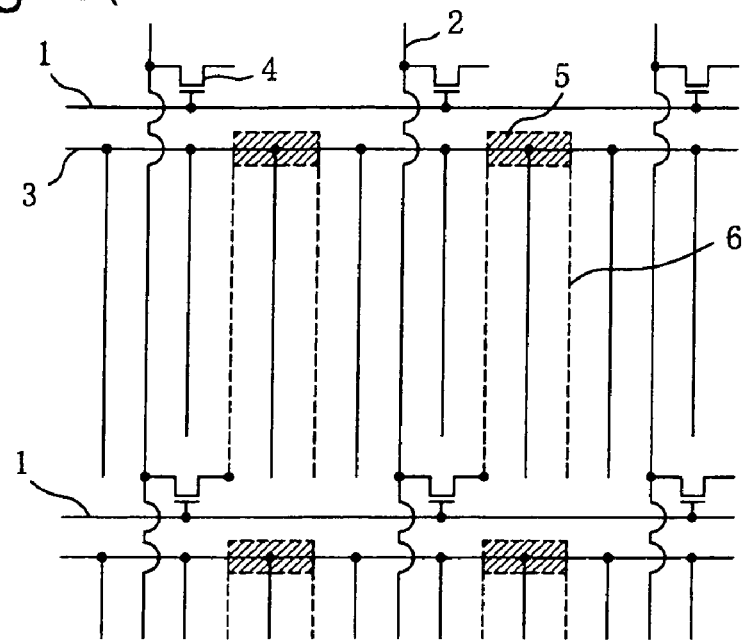
FIG. 1 is a plan view showing the structure in the transverse electric field type liquid crystal display panel in the conventional technology having one common electrode within each pixel.

In each pixel, two lines of common electrodes 12–15 (common electrodes 12 and 13, or common electrodes 14 and 15 in FIG. 1) are provided. One of the two common electrodes in each pixel is facing (in parallel with) a liquid crystal drive electrode 6 as a common electrode of the pixel, thereby forming a pixel electrode. The liquid crystal drive electrode 6 is connected to a thin film transistor which is driven by a video signal on the video signal line 2.

In addition, in FIGS. 3 and 11, one of the common electrodes is established at the upper (top) position within the pixel running along (in parallel with) the scanning line provided at the upper position of the pixel. The other common electrode is established at the lower position (bottom) of the pixel running along (in parallel with) the scanning line provided at the lower position of the pixel. The common electrode at the upper position and the common electrode at the lower position are in parallel with one another and have a predetermined distance therebetween within the pixel.

Thus, the common electrode established at the upper position (top) of the pixel is denoted as a top common electrode, and the common electrode established at the lower position (bottom) of the pixel is denoted as a bottom common electrode. Accordingly, in FIGS. 3 and 11, the common electrodes 12 and 14 are top common electrodes, and common electrodes 13 and 15 are bottom common electrodes. Numerals 10 and 11 denote the scanning lines.

Each of the common electrodes 12–15 is configured by a line-like extension which runs in parallel with the scanning line 10 or 11, and a plurality of comb-like teeth are diverged perpendicularly from the line-like extension. The comb-like teeth are aligned in parallel with the liquid crystal drive electrodes 6, and are also in parallel with the video signal lines 2.

Through the comb-like teeth, one of the common electrodes 12 and 13 faces the liquid crystal drive electrode 6 in each pixel. The liquid crystal drive electrode 6 in each pixel is connected to the video signal line 2 through a transistor (thin film transistor) 4, i.e., a switch element. Here, since only one of the two common electrodes (either common electrode 12 or 13) comprises the comb-like teeth within a particular pixel, only one of the common electrode will face the liquid crystal drive electrode 6 as a common electrode of the pixel electrode.

Further, the common electrodes 12 and 13 are structured so that the comb-like teeth portion is alternately positioned adjacent to the video signal line 2. Therefore, in the upper right pixel of FIG. 3, the comb-like teeth portion extended from the common electrode 13 is positioned close to the video signal line 2. In the next pixel, the comb-like teeth portion extended from the common electrode 12 faces the video signal line 2. Thus, the two comb-like teeth portions relative to the video signal line 2 (comb-like portions at the right and left sides of the video signal line 2) are derived from the different common electrode 12 or 13, therefore can be driven by different voltages.

Figure 2:
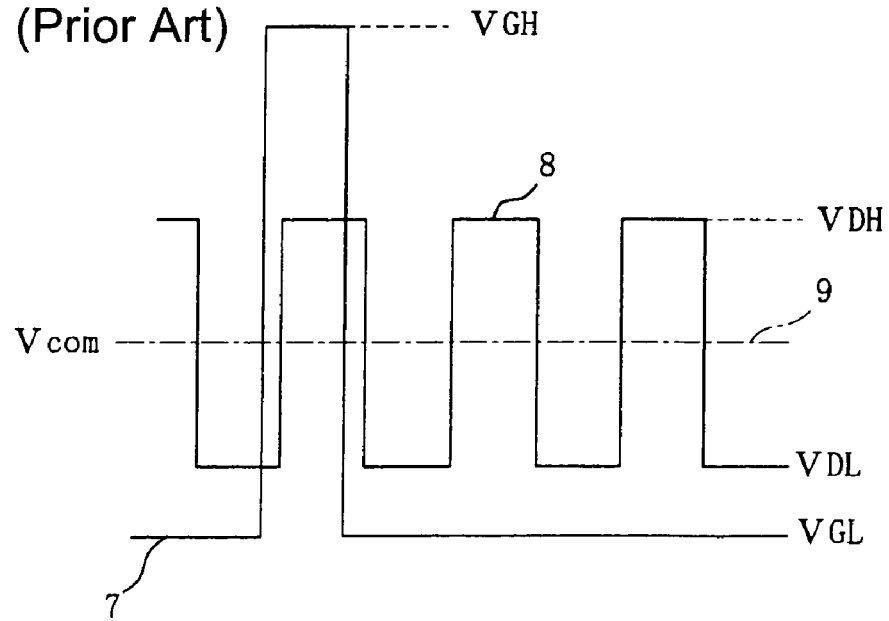
FIG. 2 shows drive signal waveforms for the transverse electric field type liquid crystal panel in the conventional technology where the electric potential of the common electrode is fixed to a constant voltage.
Figure 8:
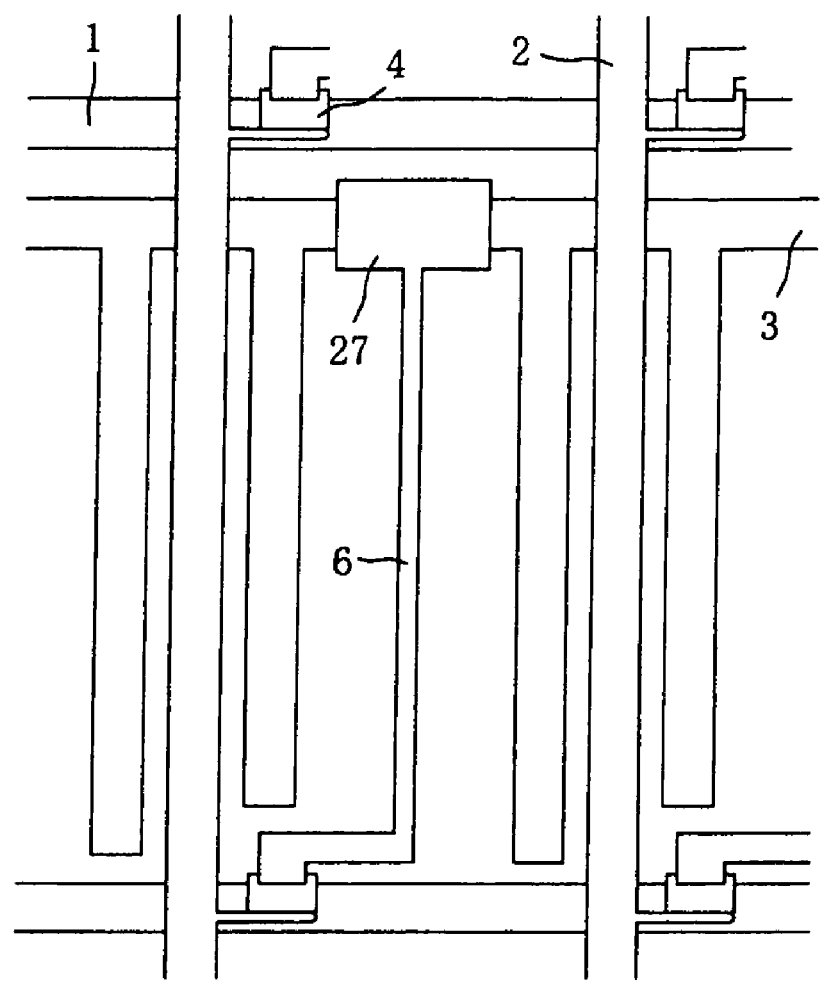
FIG. 8 is a plan view showing the structure in the transverse electric field type liquid crystal display panel in the conventional technology having one common electrode within each pixel.

In the arrangement of the present invention, with respect to a particular pixel, the pixels in the left side and the right side have the same structure and the pixels at the upper side and the lower side have the same structure. However, any two immediately adjacent pixels have different structures from one another. This is a stark difference from the liquid crystal panel in the conventional transverse electric field system where all of the pixels have the same structure as shown in FIGS. 1 and 8. Also, in the conventional structure, the voltage of the common electrode (Vcom) is fixed to a predetermined voltage as shown in FIG. 2 (fixed voltage 9). However, in the present invention, the common electrode voltages (Vcom) are not fixed to the constant value but changing alternately, as will be explained with reference to FIGS. 17 and 18.

Figure 17:
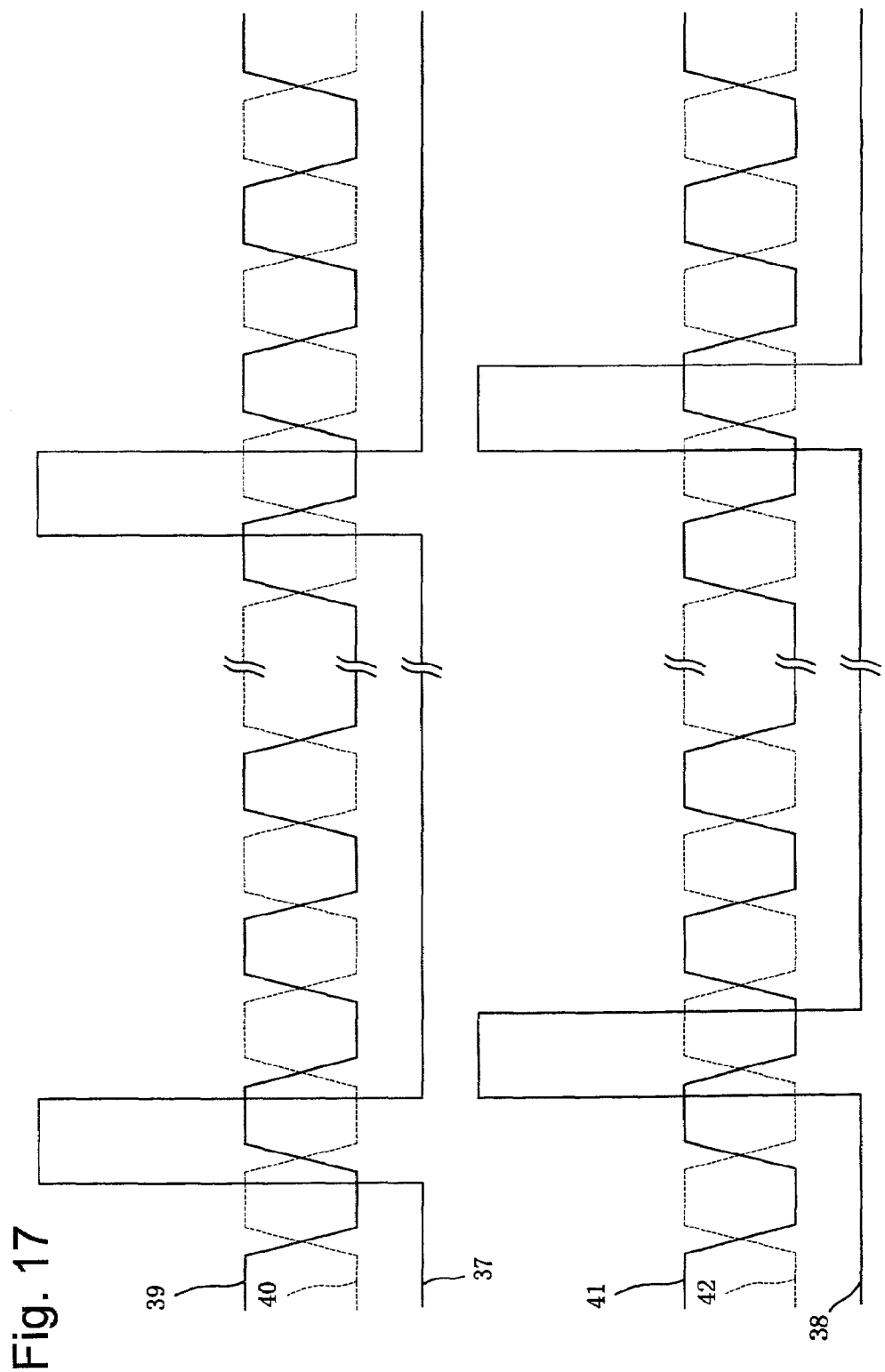
FIG. 17 is a diagram showing drive signal waveforms applied to the scanning lines and the common electrodes in the transverse electric field type liquid crystal display panel of the present invention.
Figure 18:
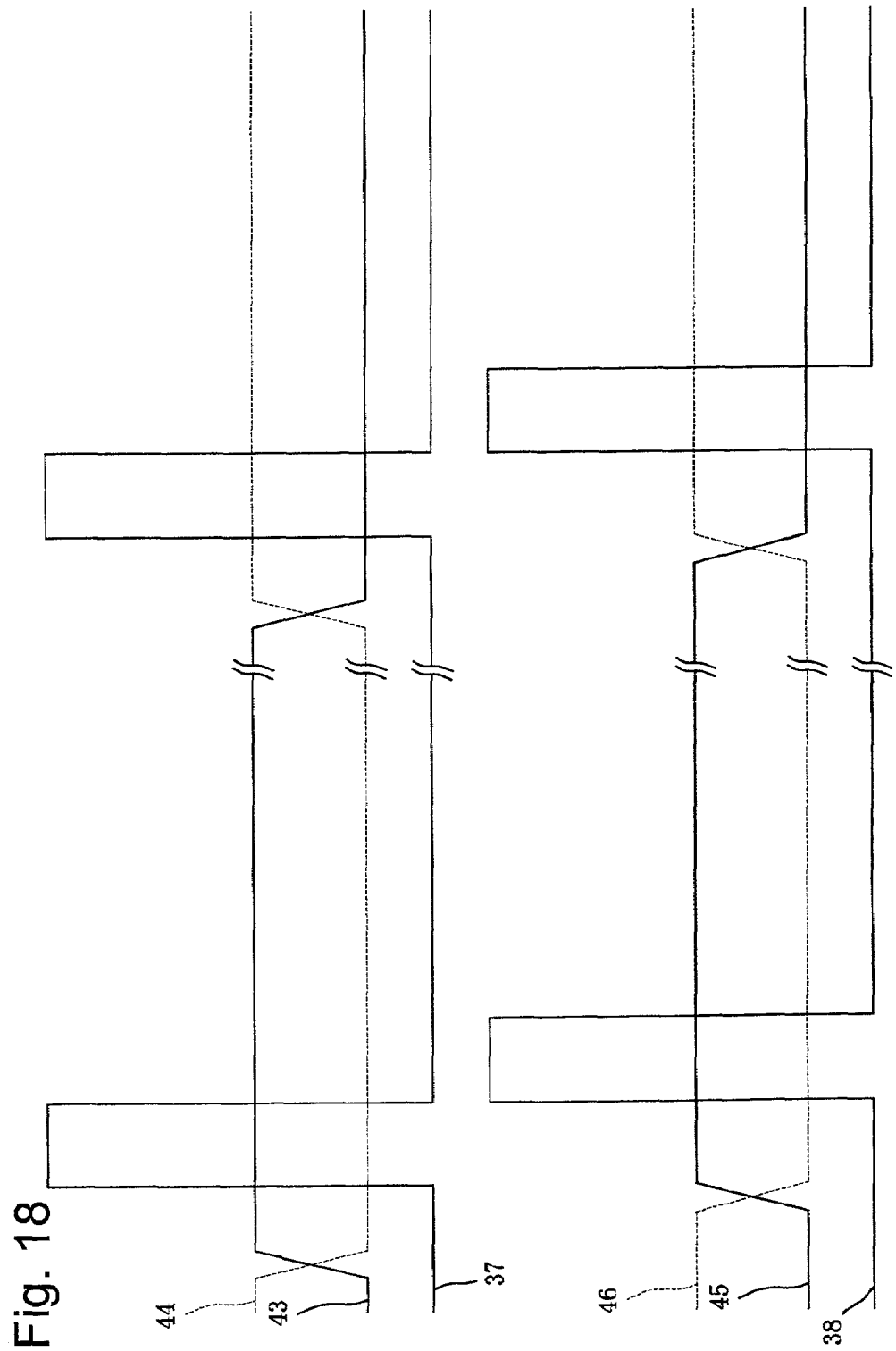
FIG. 18 is a diagram showing drive signal waveforms applied to the scanning lines and the common electrodes in the transverse electric field type liquid crystal display panel of the present invention.

FIGS. 17 and 18 are diagrams showing the drive signal waveforms provided to the scanning lines 10 and 11 and the common electrodes 12–15 in the liquid crystal display panel in the transverse electric field system of the present invention. In FIGS. 17 and 18, the horizontal axis denotes the time and the vertical axis denotes the voltage.

In the upper half of FIG. 17, a drive waveform 37 provided to the n-th scanning line 10, a voltage waveform 39 provided to the n-th top common electrode (corresponding to the common electrode 12 of FIG. 1), and a voltage waveform 40 provided to the n-th bottom common electrode (corresponding to the common electrode 13 of FIG. 1) are respectively illustrated. Here, the polarities of the voltage waveforms 39 and 40 (common electrode voltages) are alternately changing with one another at every horizontal scanning cycle.

In the lower half of FIG. 17, a drive waveform 38 provided to the (n+1)-th scanning line 11, a voltage waveform 41 provided to the (n+1)-th top common electrode (corresponding to the common electrode 14 of FIG. 1), and a voltage waveform 42 provided to the (n+1)-th bottom common electrode (corresponding to the common electrode 15 of FIG. 1) are respectively illustrated. Similarly, the polarities of the voltage waveforms 41 and 42 (common electrode voltages) are alternately changing with one another at every horizontal scanning cycle.

In the upper half of FIG. 18, a drive waveform 37 provided to the n-th scanning line 10, a voltage waveform 43 provided to the n-th top common electrode (corresponding to the common electrode 12 of FIG. 1), and a voltage waveform 44 provided to the n-th bottom common electrode (corresponding to the common electrode 13 of FIG. 1) are respectively illustrated. Here, the polarities of the voltage waveforms 43 and 44 (common electrode voltages) are alternately changing with one another at every vertical scanning cycle.

In the lower half of FIG. 18, a drive waveform 38 provided to the (+1)-th scanning line 11, a voltage waveform 45 provided to the (+1)-th top common electrode (corresponding to the common electrode 14 of FIG. 1), and a voltage waveform 46 provided to the (+1)-th bottom common electrode (corresponding to the common electrode 15 of FIG. 1) are respectively illustrated. Similarly, the polarities of the voltage waveforms 45 and 46 (common electrode voltages) are alternately changing with one another at every vertical scanning cycle.

Therefore, in the present invention, as shown in FIGS. 17 and 18, the voltages of the common electrodes 39–46 are not fixed to the constant values but are changing at every horizontal and vertical scanning cycles. The electric potentials of the two common electrodes within a unit pixel (the voltage waveforms 39, 41, 43 and 45 of the top common electrodes 12 and 14, and the voltage waveforms 40, 42, 44 and 46 of the bottom common electrodes 13 and 15) differ from one another and switch with each other at the horizontal or vertical scanning cycle. Preferably, the electric potentials of the common electrodes that sandwiches the scanning line (for example, the common electrode 13 over the scanning line 10 and the common electrode 14 under the scanning line 10) are set to different voltage values from each other so that the voltage of the scanning line will not fluctuate.

In the active matrix type liquid crystal display device in the first embodiment of the present invention, the video signal voltage can be drastically reduced. In the present invention, the common electrode voltages are alternately changing between the two common electrodes. The voltage applied to the liquid crystal is a difference between the voltage applied to the liquid crystal drive electrode and the voltage applied to the common electrode. Thus, by setting the relationship between the two voltages to achieve a largest difference, a sufficient voltage for the liquid crystal is available with a small amplitude of the video signal voltage. For example, the amplitude of the video signal requires to the liquid crystal display panel of the present invention can be reduced to about a third (⅓) of the amplitude required in the conventional technology.

This advantage is further explained with reference to FIGS. 2, 19, 33 and 34. In general, in a liquid crystal display panel for large scale monitors, a dot inverse driving method is typically used to reduce flickers and cross talks. In this method, when the electric potential of the common electrode (Vcom) is fixed to a constant voltage as in the conventional technology shown in FIG. 2, the amplitude (peak-to-peak voltage) of the video signal voltage applied to the video signal line will be VDH+VDL.

Figure 19:
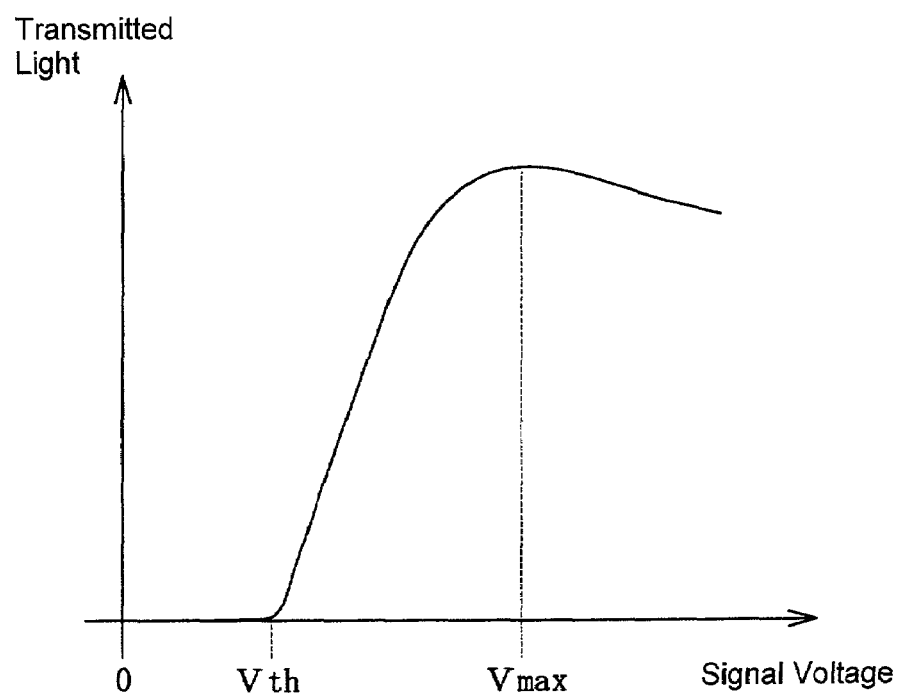
FIG. 19 is a diagram showing the relationship between the video signal voltage and transmitted light in the transverse electric field type liquid crystal display panel.

The maximum video signal voltage (liquid crystal drive voltage) Vmax at each cycle is basically the same as VDH or VDL in the transverse electric field system and is shown in FIG. 19. In FIG. 19, a reference Vth denotes a threshold voltage when the liquid crystal starts to transmit the light, which is about 2V (volts). The maximum voltage Vmax is a voltage where the amount of light transmission becomes the largest, which is about 7V (volts). The maximum video signal voltage Vmax and the video signal amplitude (VDH+VDL) have the following relationship: (VDH−VDL) ≧2Vmax. When the common electrodes and liquid crystal drive electrodes become further apart for improving the aperture ratio, for example, the voltage of Vmax has to be increased.

Figure 33:
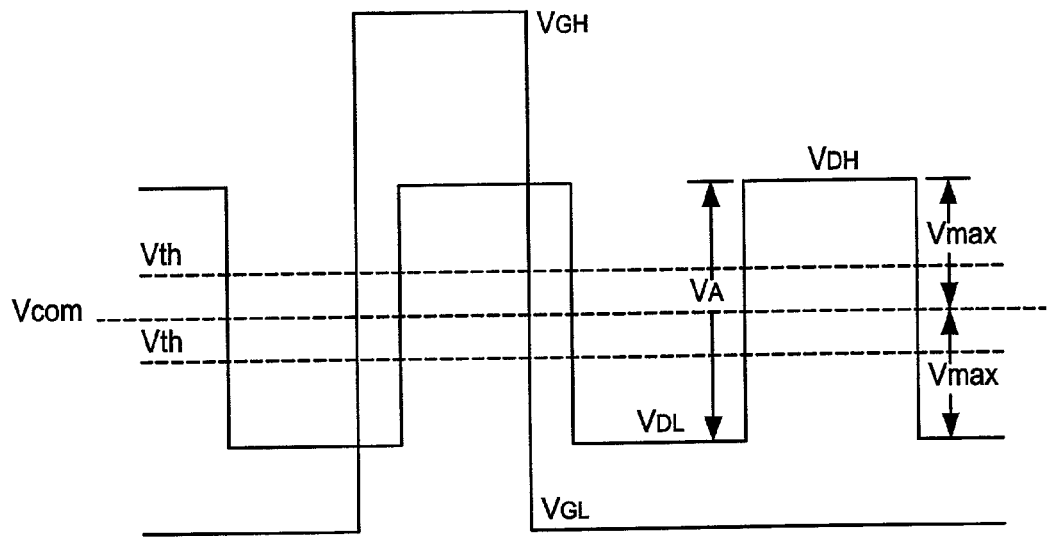
FIG. 33 is a waveform diagram for explaining a voltage amplitude required for the drive signal on the video signal line in the liquid crystal display device in the convention technology.

FIG. 33 shows the waveforms of video signal voltages, common electrode voltage, and scanning signal voltage in the conventional liquid crystal display device. The common electrode voltage Vcom is fixed to a constant voltage such as zero volt. The scanning signal having the amplitude VGH+VGL is applied to the scanning line. The video signal voltage having the amplitude VDH+VDL is applied to the video signal line. As shown above, the maximum video signal voltage Vmax is basically the same as VDH or VDL. As noted above, typically, maximum voltage Vmax is about 7V and the threshold voltage Vth is about 2V.

Figure 34:
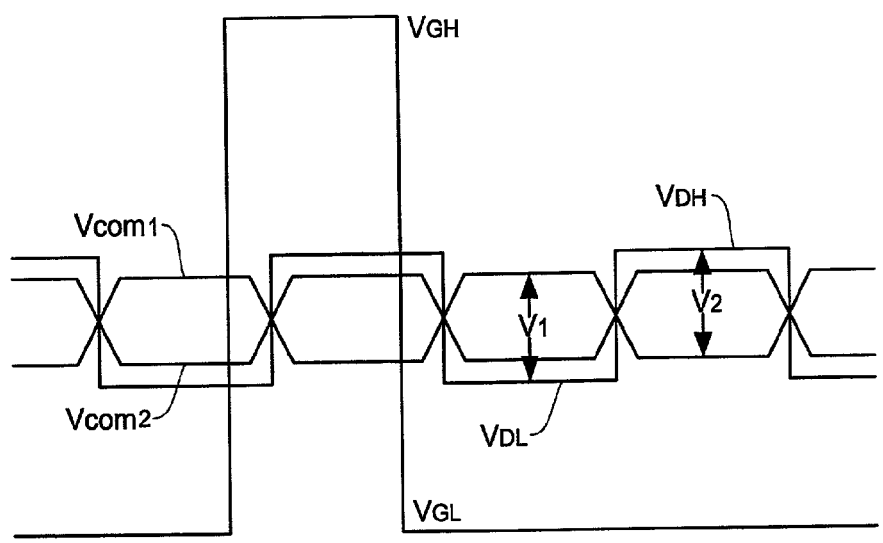
FIG. 34 is a waveform diagram for explaining a voltage amplitude required for the drive signal on the video signal line in the liquid crystal display device in the present invention.

FIG. 34 shows the waveforms of video signal voltages, common electrode voltage, and scanning signal voltage in the present invention. The common electrode voltages Vcom1 and Vcom2 for the two common electrodes are changing alternately as shown in FIG. 34. It is assumed that common electrode voltages Vcom1 and Vcom2 change between voltages similar to the threshold voltages, i.e, +Vth and −Vth. By arranging the relationship so that the positive video signal voltage is applied when the common electrode voltage is negative, and conversely, the negative video signal voltage is applied when the common electrode voltage is positive, the video signal with a small amplitude (VDH+VDL) can sufficiently drive the liquid crystal as shown in FIG. 34. For example, a drive voltage V1 or V2 which is a difference between the maximum voltage Vmax and the threshold voltage Vth, i.e., Vmax—Vth, can sufficiently drive the liquid crystal. As a result, in the present invention, the video signal voltage can be decreased to about a third (⅓) of that of the conventional technology.

As a further advantage, in the active matrix type liquid crystal display device of the present invention, unwanted changes in the voltages on the two common electrodes can be canceled with one another, thereby enabling to prevent the fluctuation in the voltage on the scanning line.

Figure 10:
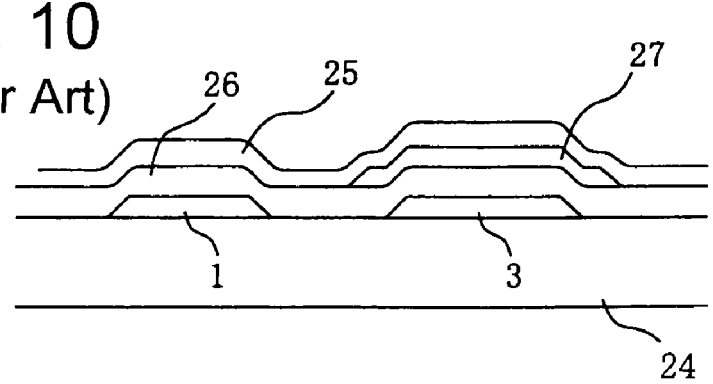
FIG. 10 is a cross sectional view showing a structure of a hold capacitor in the transverse electric field type liquid crystal display panel in the conventional technology.

In FIG. 3, the hold capacitor 16 is formed by a structure which sandwiches a gate insulation layer 26 (shown in FIG. 10) by one of the common electrodes 12–15 and the liquid crystal drive electrode 6. The cross sectional structure of the hold capacitor 16 is shown in FIG. 10. In the example of FIG. 10, the scanning line 1 (scanning line 10 in FIG. 3) and the common electrode 3 (common electrodes 12–15 in FIG. 3) are respectively formed on the same surface of an active matrix glass substrate 24 at a predetermine distance. A gate insulation layer 26 is laminated on the scanning line 1 and the common electrode 3 to secure the insulation of the scanning line and the common electrode 3 toward the upper direction of the cross section.

Further, a liquid crystal drive electrode 27 is formed on the gate insulation layer 26. The liquid crystal drive electrode 27 is a part of the liquid crystal drive electrode 6, and overlaps (crosses) the common electrode 3 below (in the lower position in the cross sectional). Hence, the insulation for the common electrode 3 and the liquid crystal drive electrode 6 is secured in the vertical direction by the gate insulation layer 26, while the hold capacitor is formed by the gate insulation layer 26 sandwiched by the common electrode 3 and the liquid crystal drive electrode 6 (27). With use of the structure as shown in FIG. 10, the electric field of the video signal line can be easily shielded, and the vertical cross talks which tend to be easily caused in the liquid crystal panel in the transverse electric field system can be dramatically reduced.

Figure 13:
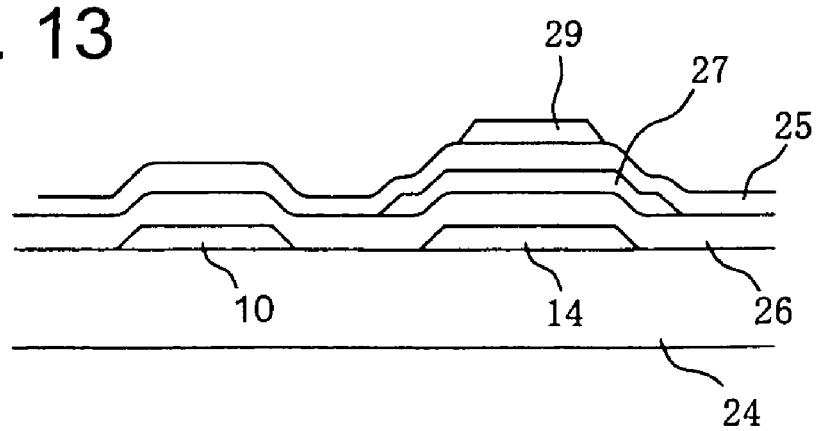
FIG. 13 is a cross sectional view showing an example of structure of a hold capacitor in the transverse electric field type liquid crystal display panel in the first embodiment of the present invention.

In FIG. 11, the hold capacitor is formed by having one of the common electrodes 14 and 15 and the liquid crystal drive electrode 6 cross with one another. The cross sectional view of the hold capacitor of FIG. 11 is illustrated in FIG. 13. As noted above, the liquid crystal drive electrode 27 is part of the liquid crystal drive electrode 6 and is sandwiched by the gate insulation layer 26 and the passivation layer 25 as shown in FIG. 13. More specifically, the scanning line 10 and the common electrode 14 are formed on the same surface of the active matrix glass substrate 24 at a predetermined distance. The gate insulation layer 26 is laminated on the scanning line 10 and the common electrode 14 (upper part of the cross section) in order to secure the insulation of the scanning line 10 and the common electrode 3 in the upward direction.

The liquid crystal drive electrode 27 (part of the liquid crystal drive electrode 6) is formed on the gate insulation layer 26. The liquid crystal drive electrode 27 is formed at a position overlapping (crosses) the common electrode 14 below (lower part of the cross section). The passivation layer 25 is laminated on the liquid crystal drive electrode 27 in order to secure the upward insulation (upper position of the cross section), and a transparent electrode 29 is formed on the passivation layer 25.

The position of the transparent electrode 29 is designed to overlap the liquid crystal drive electrode 27 below. The transparent electrode 29 will be electrically driven through contact holes 28 and the common electrode 14 positioned under the transparent electrode 29 in cross section. Therefore, the transparent electrode 29 has the same electric potential as the common electrode 14. In other words, the transparent electrode 29 is a common electrode formed on the liquid crystal drive electrode 27.

Figure 12:
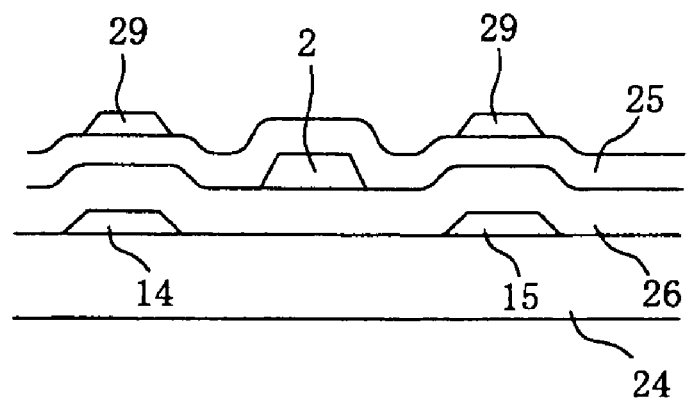
FIG. 12 is a cross sectional view showing an example of structure of a video signal line and the common electrodes in the transverse electric field type liquid crystal display panel in the first embodiment of the present invention.

FIG. 12 is a cross sectional view of the video signal line 2 and the common electrodes 14 and 15. As shown in FIG. 12, the common electrodes 14 and 15 are formed on the same surface of the active matrix glass substrate 24 at a predetermined distance. The gate insulation layer 26 is laminated on the common electrodes 14 and 15 in order to secure the insulation in the upward direction. The video signal line 2 is formed on the gate insulation layer 26 at a middle position between the common electrodes 14 and 15.

The passivation layer 25 is laminated on the video signal line 2 in order to secure the insulation of the video signal line 2 in the upward direction. The transparent electrodes 29 are respectively formed on the passivation layer 25 at positions that overlap the corresponding common electrodes 14 and 15 as well as at both sides of the scanning line 2. The transparent electrode 29 formed on the common electrode 14 is connected to the common electrode 14 through the contact hole 28 (FIG. 11), and similarly, the transparent electrode 29 formed over the common electrode 15 is connected to the common electrode 15 through the contact hole 28 (FIG. 11).

Embodiment 2

Figure 4:
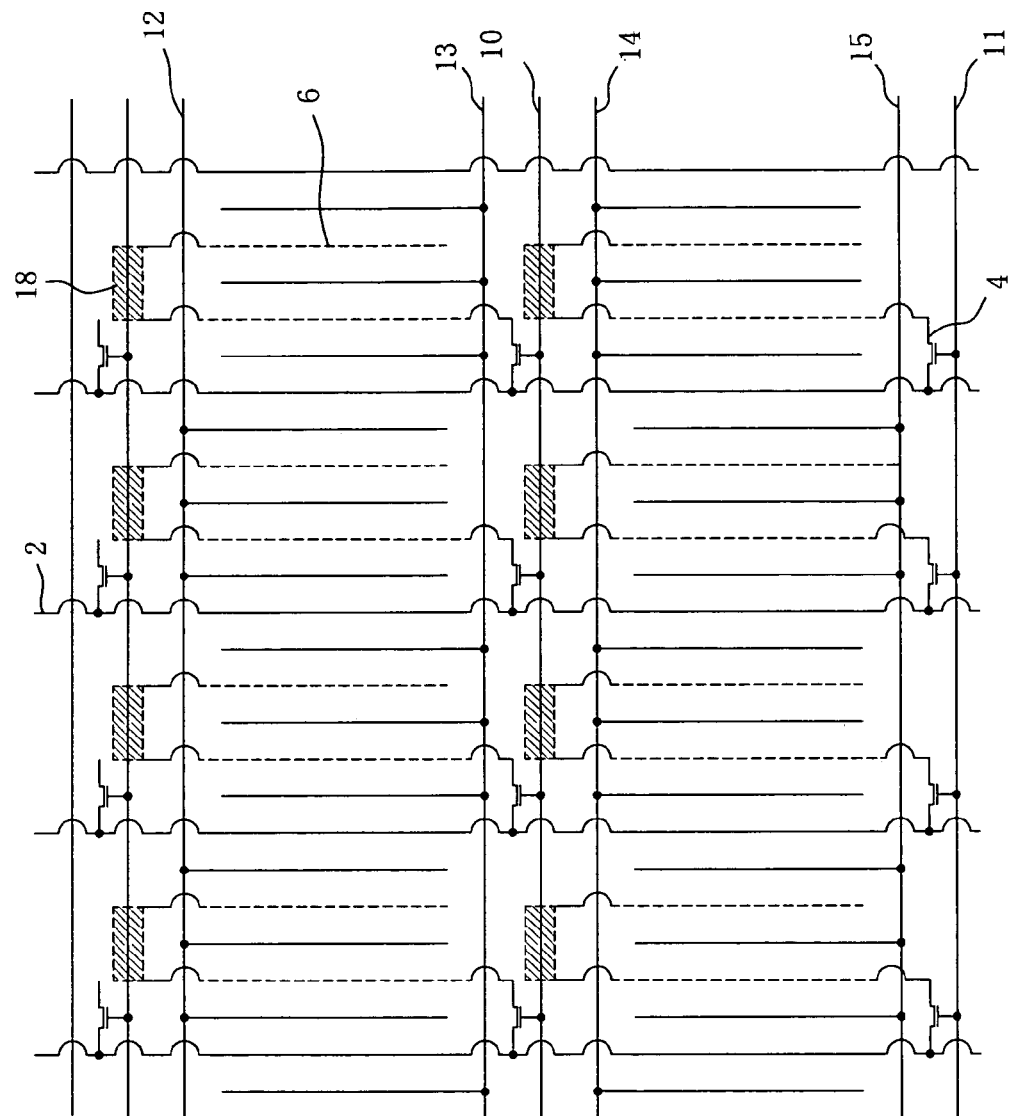
FIG. 4 is a plan view showing an example of structure in the transverse electric field type liquid crystal display panel in the second embodiment of the present invention having two common electrodes within each pixel.
Figure 5:
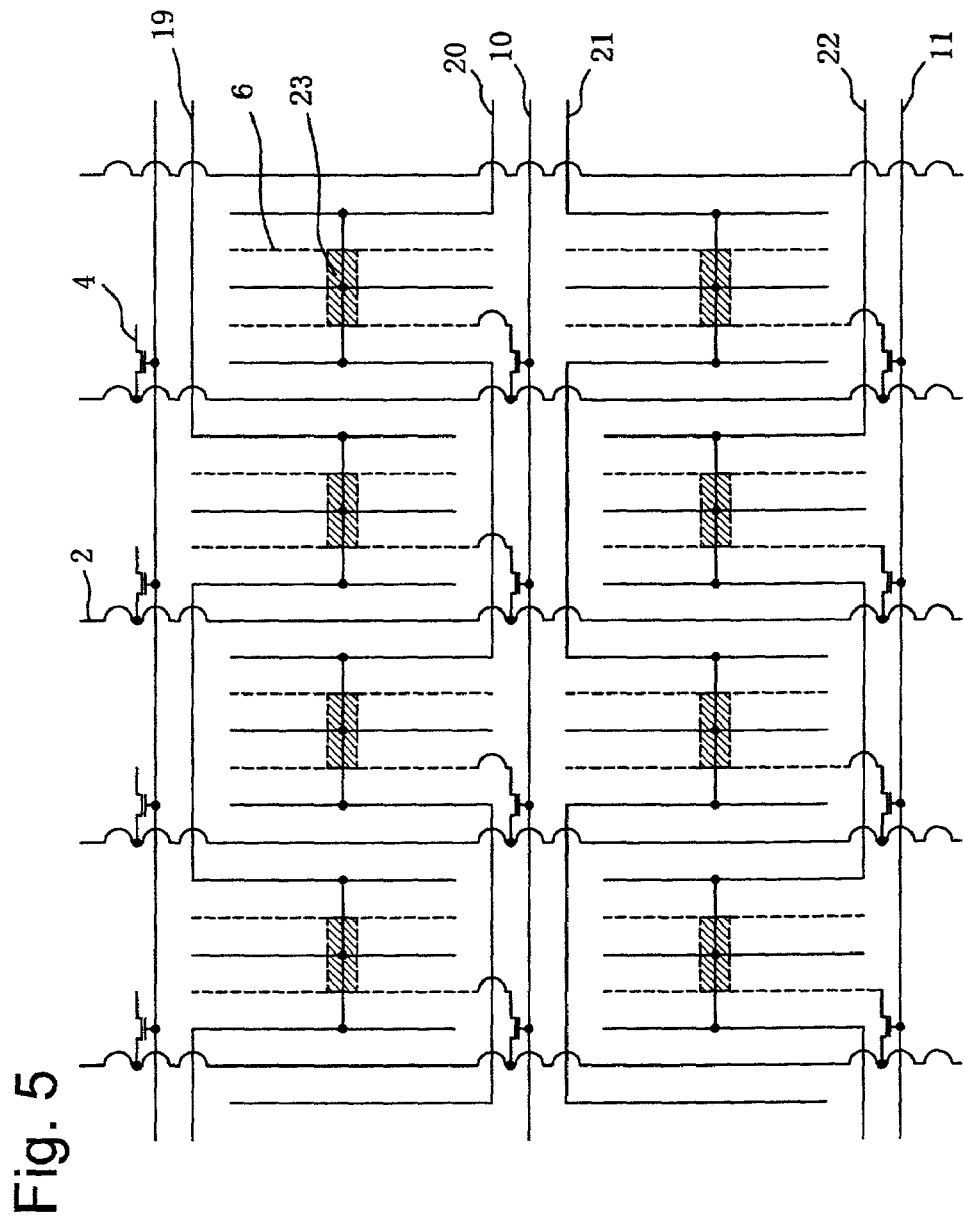
FIG. 5 is a plan view showing another example of structure in the transverse electric field type liquid crystal display panel in the second embodiment of the present invention having two common electrodes within each pixel.

FIGS. 4 and 5 are plan views of the liquid crystal display device in the second embodiment of the present invention. The arrangement of the common electrodes 12–15 within the unit pixel is the same as that in the first embodiment. In the first embodiment of the active matrix type liquid crystal display device described above, the hold capacitor is formed by the crossing of the liquid crystal drive electrode 6 (liquid crystal drive electrode 27) and one of the common electrodes 12–15. However, in the second embodiment, the formation of the hold capacitor is different from the first embodiment. Here, the parts similar to the first embodiment will be denoted by the same reference numbers, and their explanation of which will be omitted.

In FIG. 4, a hold capacitor 18 in the second embodiment is formed by the scanning line 10 and the liquid crystal drive electrode 6. Namely, the hold capacitor 18 is established by sandwiching the gate insulation layer 26 (such as shown in FIGS. 12 and 13) by the two electrodes, one is the scanning line 10 and the other is the liquid crystal drive electrode 6. Further, in FIG. 5, a hold capacitor 23 is formed by common electrodes 19–22 and the liquid crystal drive electrode 6. Namely, the hold capacitor 23 is created by sandwiching the gate insulation layer 26 (such as shown in FIGS. 12 and 13) by the two electrodes, one is the liquid crystal electrode 6 and the other is one of the common electrodes 19–22.

In the example of FIG. 4, the hold capacitor 18 is located at the upper end of the pixel. In contrast, in the example of FIG. 5, the hold capacitor 23 is positioned at about the center of the pixel due to the center crossing of one of the common electrodes and the liquid crystal drive electrodes 6. Due to this structure, each of the common electrodes 19–22 is shaped in a rectangular shape a part of which extends along the scanning lines 10 and 11 and the other part of which diverts perpendicularly therefrom as shown in FIG. 5.

In the active matrix type liquid crystal display device of the present invention, the hold capacitor is created which is able to suppress changes in the voltage of the liquid crystal drive electrode even if there is a large current leakage from thin film transistors. Accordingly, it is possible to achieve the liquid crystal display device with high contrast.

Embodiment 3

Figure 6:
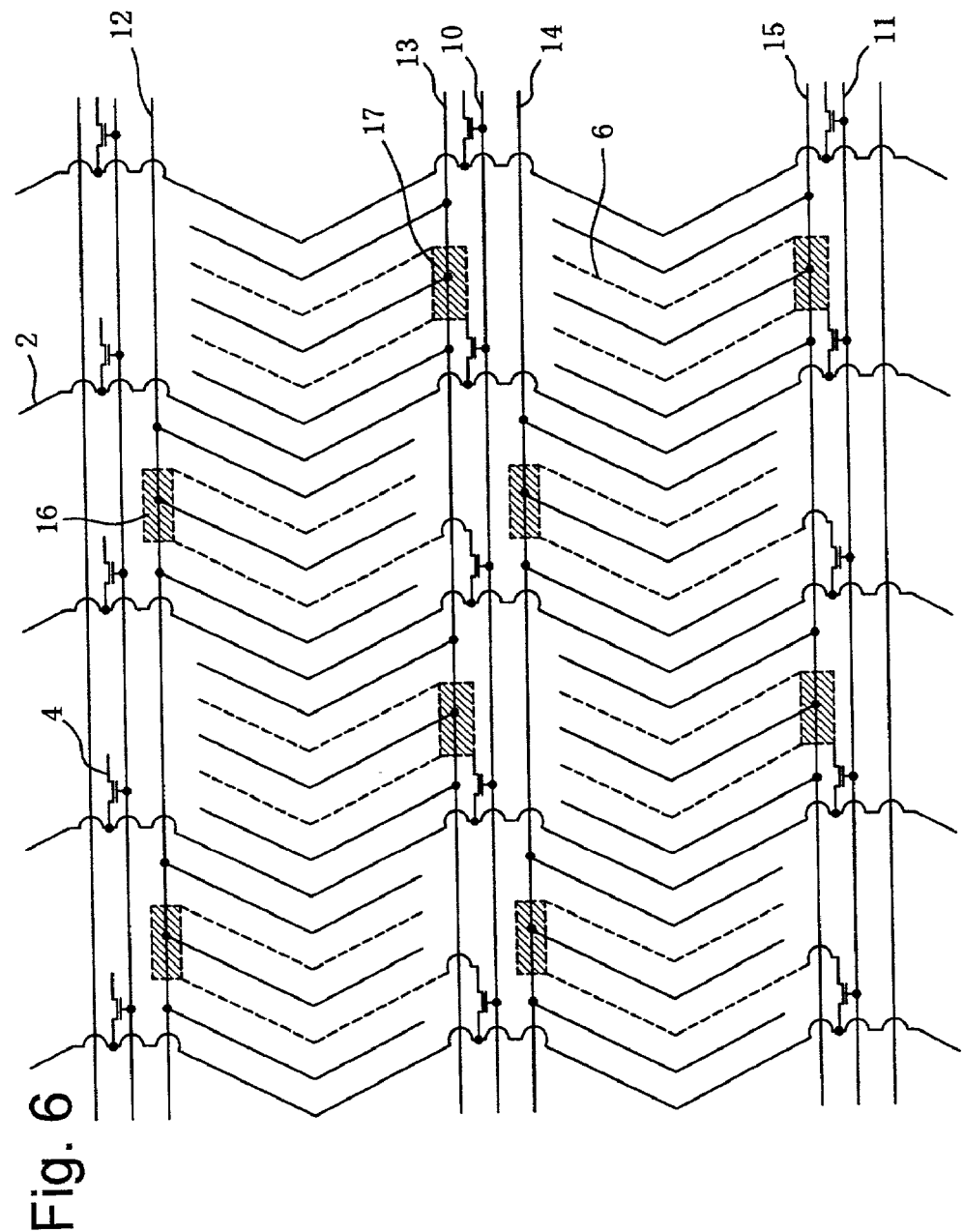
FIG. 6 is a plan view showing an example of structure in the transverse electric field type liquid crystal display panel in the third embodiment of the present invention having two common electrodes within each pixel.
Figure 14:
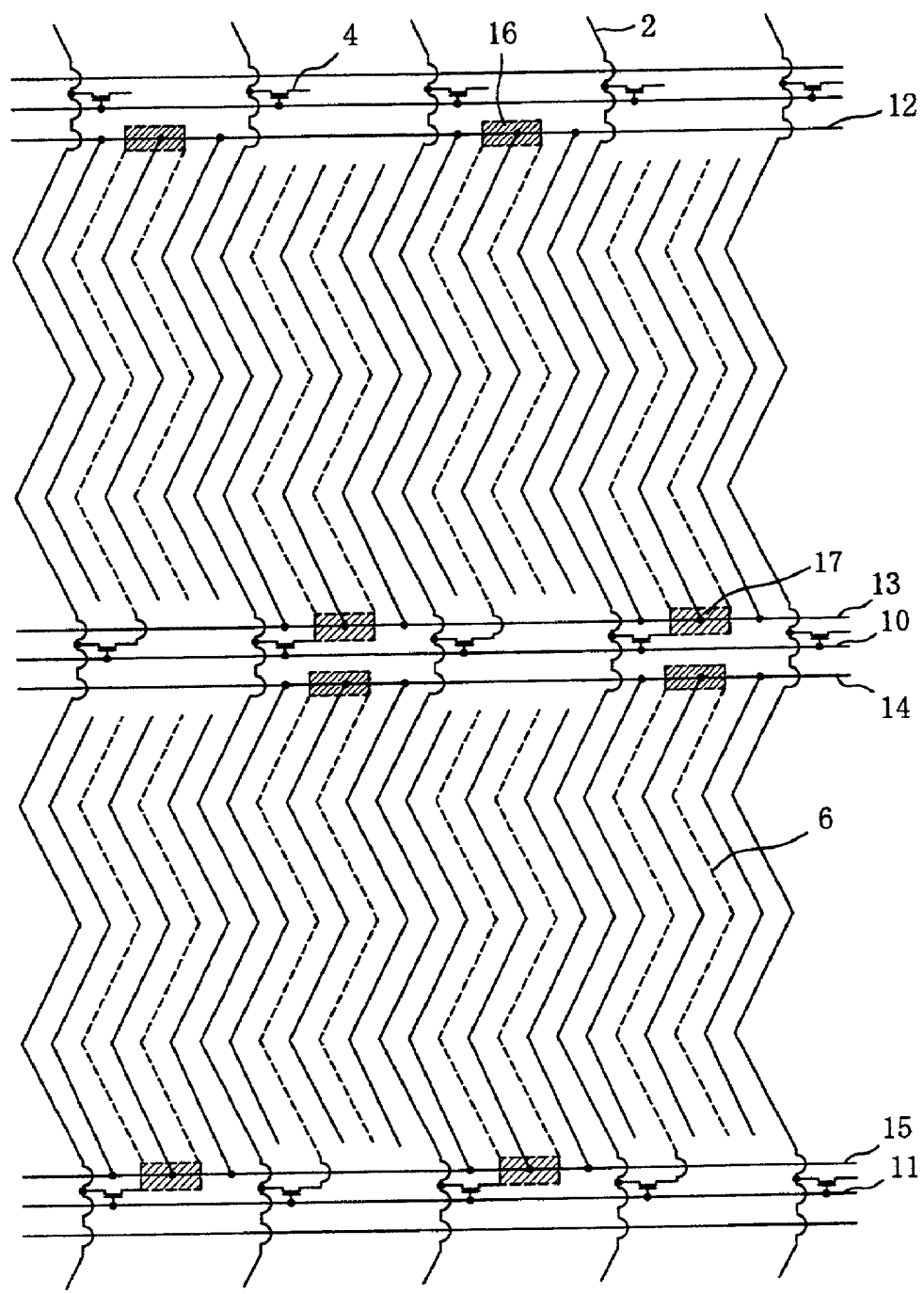
FIG. 14 is a plan view showing an example of structure in the transverse electric field type liquid crystal display panel in the third embodiment of the present invention having two common electrodes within each pixel.

FIGS. 6 and 14 are plan views of the liquid crystal display device in the third embodiment of the present invention. The arrangement of the common electrodes 12–15 in the unit pixel is the same as that of the first embodiment. In the third embodiment, the video signal line 2, the common electrodes 12–15, and the liquid crystal drive electrode 6 are bent relative to the alignment direction of the liquid crystal. With respect to the common electrodes 12–15, the part forming the comb-like electrodes are bent. Here, the components which are the same or similar to the first and second embodiments are denoted with the same reference numbers and the explanation of which is omitted.

In FIG. 6, the comb-like electrodes of the common electrodes 12–15, the video signal line 2, and the liquid crystal drive electrode 6 are diagonally aligned in a parallel fashion with one another. At the about the center of each pixel, the diagonally aligned such lines and electrodes are bent in an opposite diagonal direction. In other words, in each pixel, the comb-like electrodes of the common electrodes 12–15, the video signal line 2, and the liquid crystal drive electrodes 6 are bent once at the center. In contrast, in the example of FIG. 14, the lines and electrodes in each pixel are bent three times.

Figure 25:
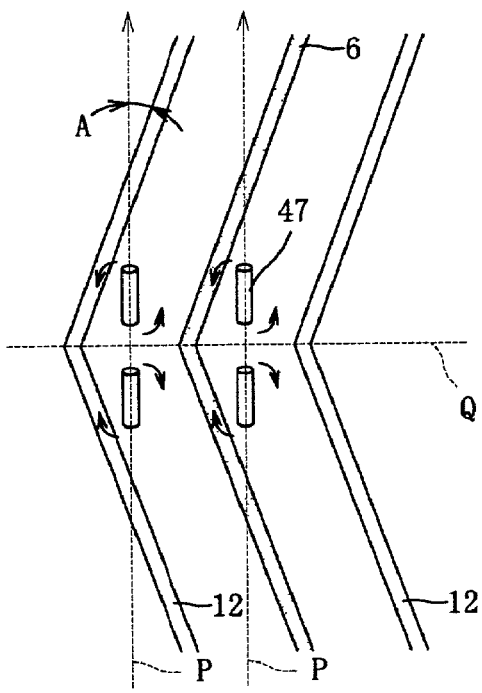
FIG. 25 is a diagram showing an alignment direction of the positive dielectric constant anisotrophy liquid crystal molecule within the bent pixel electrodes in the transverse electric field system of the present invention.

FIG. 25 shows the relationship between an alignment direction P of the liquid crystal and an intersecting angle A of the various electrodes and lines (expressed by the bent structure of the common electrode 12 and the bent structure of liquid crystal drive electrode 6) when using positive dielectric constant anisotrophy liquid crystal 47. The intersecting angle A is defined as an angle resulted by crossing the alignment direction P (optical axis, i.e., direction of polarization axis of the polarization plate) and the direction of the common electrode 12 or liquid crystal drive electrode 6. Preferably, the intersecting angle A is within a range between ±1° and ±30°, although the range between ±10° and ±20° is the most desirable in practical applications. In FIG. 25, Q denotes a optical axis, i.e., a direction of polarization axis of the polarization plate. Thus, more precisely, two intersecting angles A, one is upper side of the axis Q within the range −1° and −30° and another is lower side of the axis Q within the range −1° and −30° are incorporated for one bent.

Figure 26:
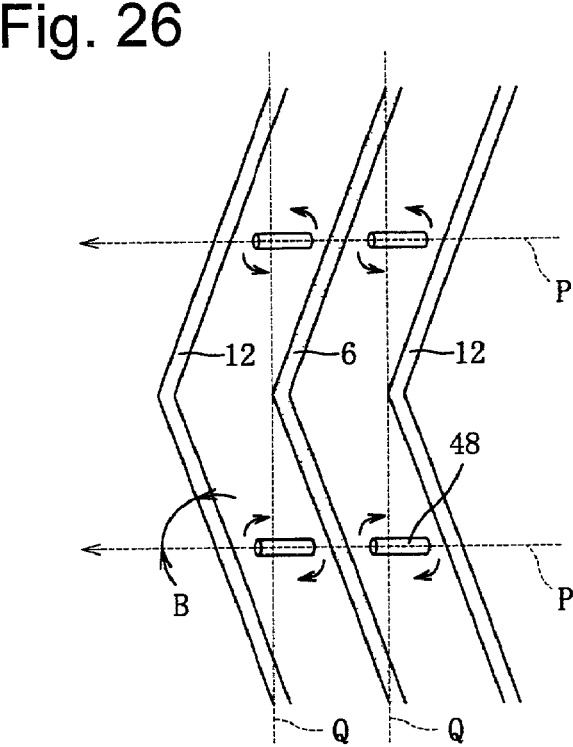
FIG. 26 is a diagram showing the alignment direction of the negative dielectric constant anisotrophy liquid crystal molecule within the bent pixel electrodes in the transverse electric field system of the present invention.

FIG. 26 shows the relationship between an alignment direction P of the liquid crystal and an intersecting angle B of the various electrodes and lines when using negative dielectric constant anisotrophy liquid crystal 48 (expressed by bent structure of the common electrode 12 and the bent structure of the liquid crystal drive electrodes 6). The intersecting angle B is defined as an angle resulted by crossing the alignment direction P and the direction of the common electrode 12 or liquid crystal drive electrode 6. Preferably, the intersecting angle B is within a range between ±60° and ±89°, although the range between ±70° and ±80° is the most desirable in the actual applications. More precisely, two intersecting angles B, one is upper side of FIG. 26 within the range +60° and +89° and another is lower side of FIG. 26 within the range −60° and −89° are incorporated for one bent.

In the third embodiment shown in FIGS. 6 and 14, three types of electrodes, namely, the video signal line 2, the common electrodes 12–15, and the liquid crystal drive electrodes 6, are bent. However, in this embodiment, the video signal line 2 does not always have to be bent. Yet, in order to increase the aperture ratio, the video signal line is preferably bent as well. In the third embodiment of the present invention, the number of bents is one in FIG. 6 and three in FIG. 14, however, there is no limit to the number of such bends. Thus, the number of bents in each pixel can be more than three, such as five or more.

In the active matrix type liquid crystal display of the present invention, there arise two rotating directions of the liquid crystal molecule in the pixel as shown in FIGS. 25 and 26, thereby able to prevent the occurrence of color shift and gray scale inversion, resulting in excellent display quality. Further, when applying this method, the polarization axis of the polarization plate and the vertical and horizontal axis of the liquid crystal panel will match with one another, which improves availability of the polarization plate as well as reduces the cost of the polarizing plate. By bending the color filter or black mask at the same angle as the video signal line and pixel electrodes as in the foregoing, the aperture ratio can be improved, resulting in a liquid crystal display device with high brightness.

Embodiment 4

Figure 15:
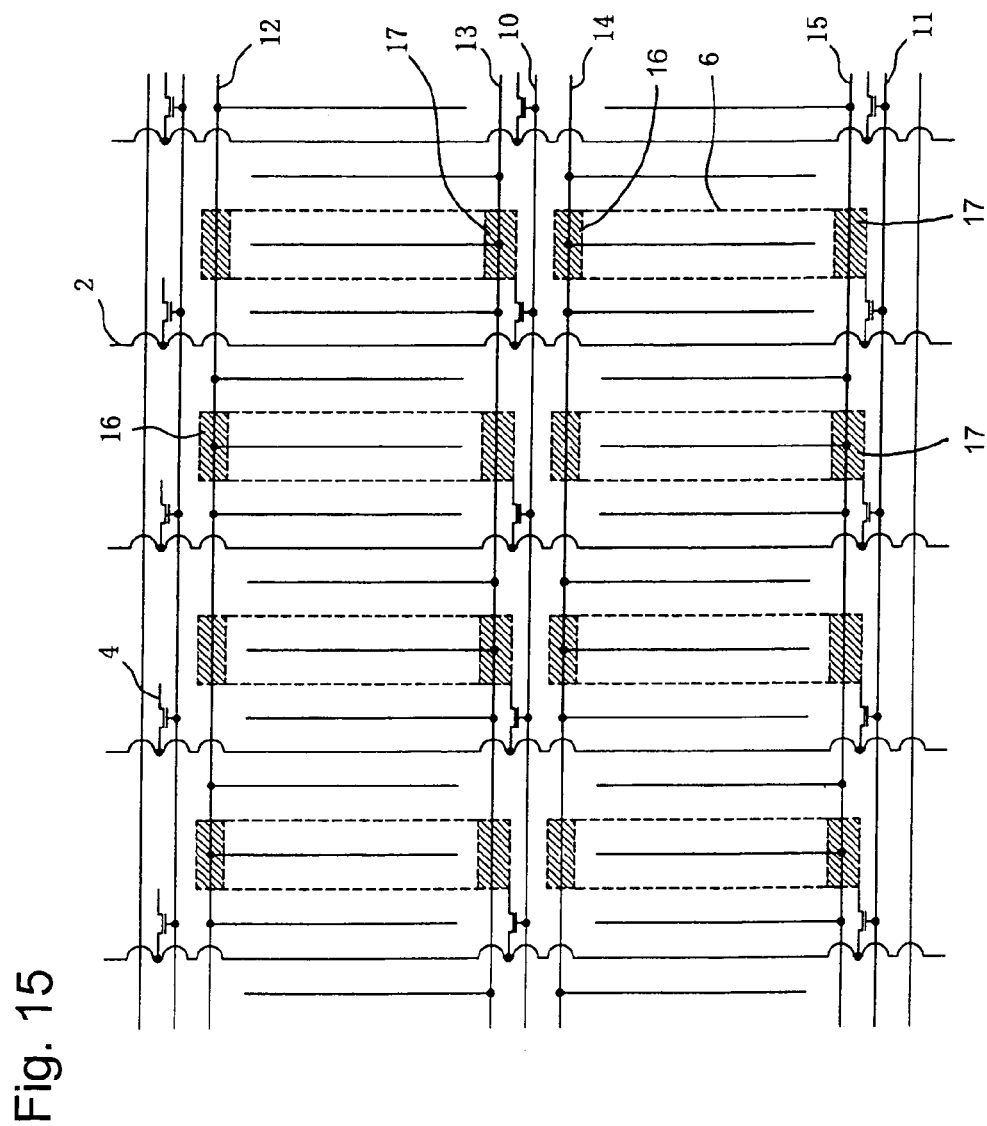
FIG. 15 is a plan view showing an example of structure in the transverse electric field type liquid crystal display panel in the fourth embodiment of the present invention having two common electrodes within each pixel.
Figure 16:
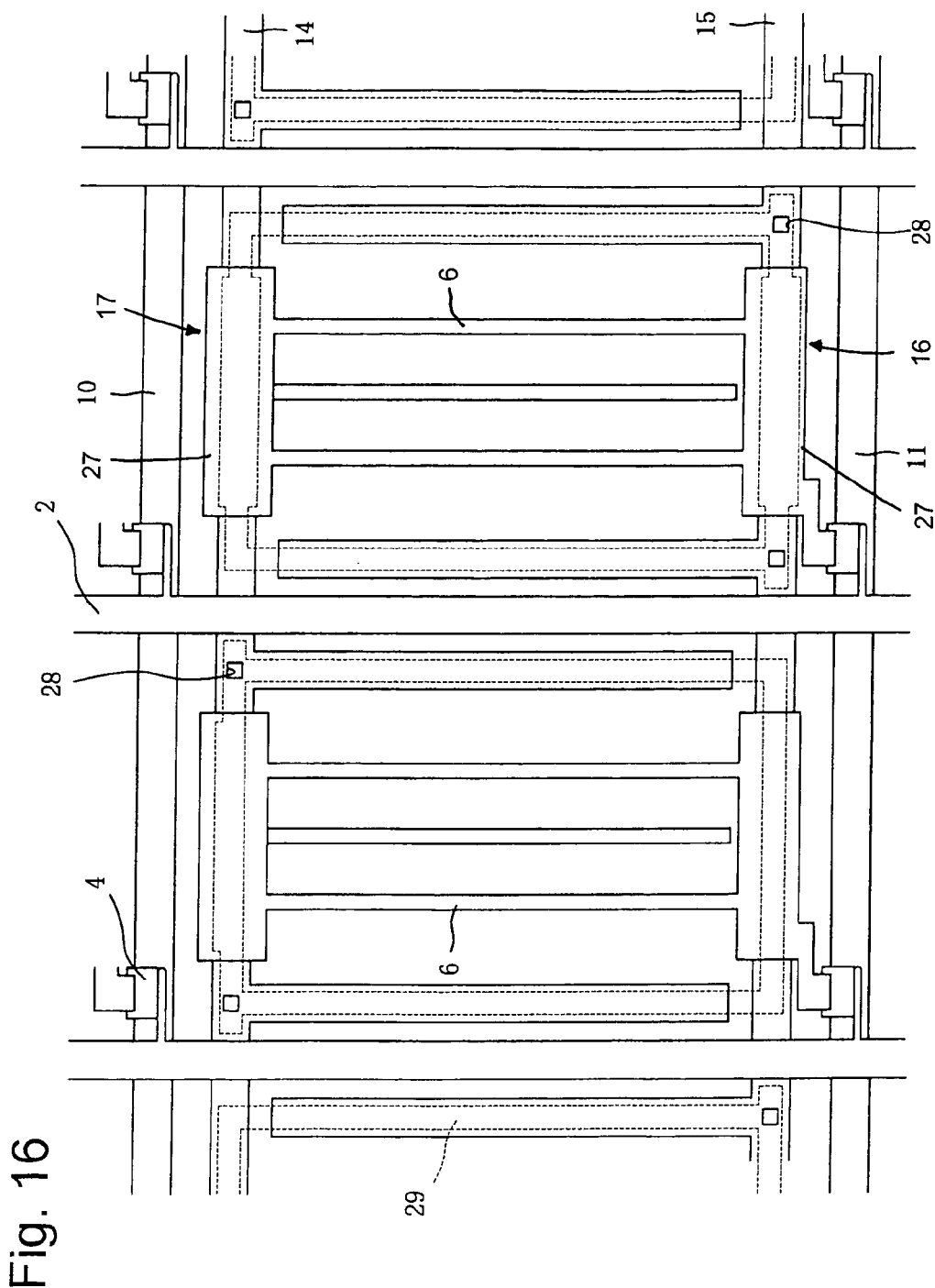
FIG. 16 is a plan view showing an example of structure of a hold capacitor in the transverse electric field type liquid crystal display panel in the fourth embodiment of the present invention.

FIGS. 15 and 16 are plan views showing the liquid crystal display panel in the fourth embodiment of the present invention. The arrangement of the common electrodes 12–15 within the unit pixel is the same as that described with respect to the first embodiment. In FIGS. 15 and 16, at the upper and lower locations in each pixel, hold capacitors 16 and 17 are formed by the common electrodes 12–15 and the liquid crystal drive electrode 6. Here, the components which are the same or similar to that in the first, second, and third embodiments are denoted by the same reference numbers and the explanation of which is omitted.

In each pixel in the fourth embodiment, the liquid crystal drive electrode 6 and the top common electrode 12 or 14 overlap (cross) with one another, and the liquid crystal drive electrode 6 and the bottom common electrode 13 or 15 also overlap (cross) with one another. In other words, the liquid crystal drive electrode 6 and the common electrodes 12–15 overlap two times within the pixel, thereby creating two hold capacities 16 and 17 within the pixel as shown in FIGS. 15 and 16.

In this configuration, the drive voltage waveform for the two common electrodes (two common electrodes 12 and 13 or two common electrode 14 and 15 running in parallel in each pixel) are switched alternately, i.e., changed its polarity, at each vertical scanning period as shown in FIG. 18. The electrodes comprising the two hold capacitors 16 and 17 in this embodiment of FIGS. 15 and 16 can be bent in the manner shown in FIGS. 6 and 14.

Embodiment 5

Figure 22:
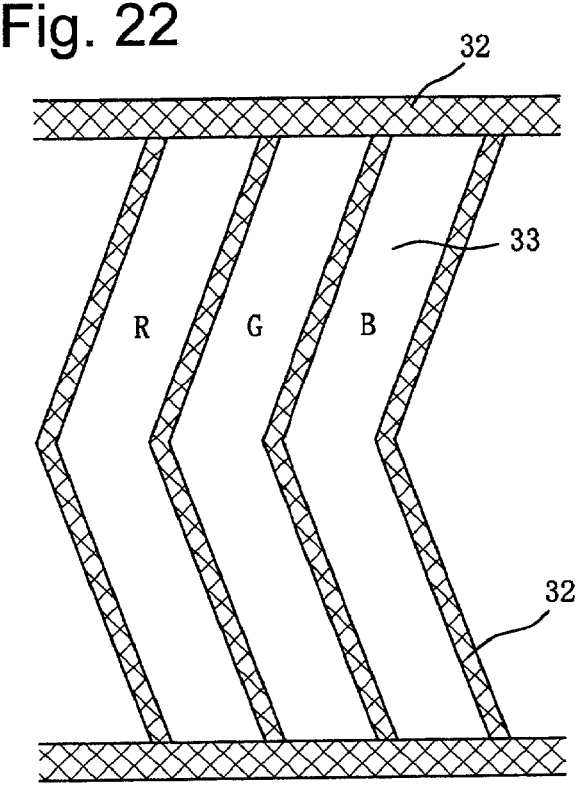
FIG. 22 is a plan view showing an example of structure of a color filter layer and a black mask in the transverse electric field type crystal display panel in the fifth embodiment of the present invention.
Figure 23:
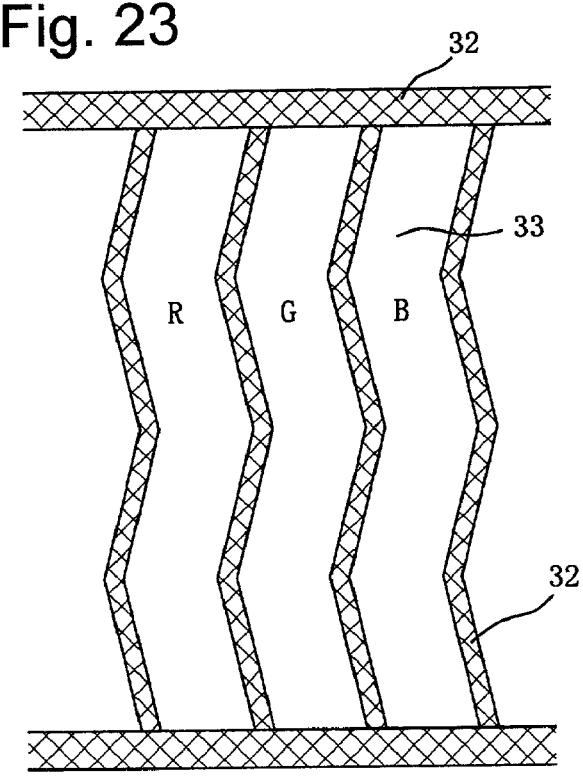
FIG. 23 is a plan view showing another example of structure of a color filter layer and a black mask in the transverse electric field type crystal display panel in the fifth embodiment of the present invention.
Figure 24:
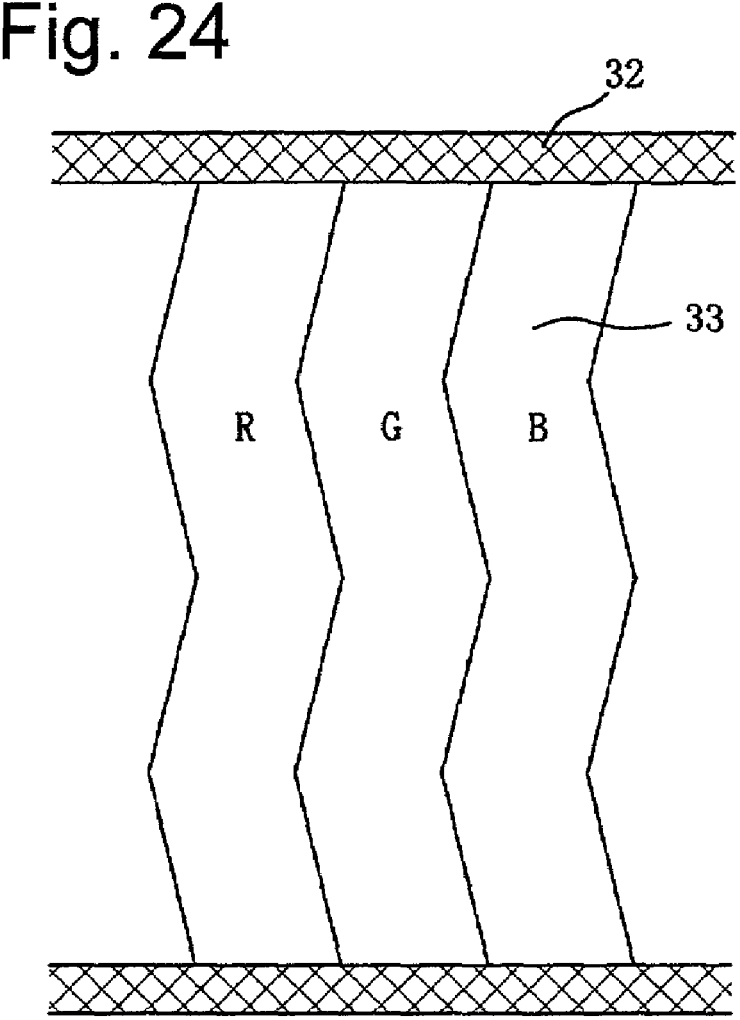
FIG. 24 is a plan view showing a further example of structure of a color filter layer and a black mask in the transverse electric field type crystal display panel in the fifth embodiment of the present invention.

FIGS. 22, 23 and 24 show the liquid crystal display device in the fifth embodiment of the present invention. In this embodiment, along with the video signal line 2 which is bent in a manner of FIGS. 6 and 14, a black mask 32 and a color filter layer 33 are also bent in the same angle as the video signal line 2. The black mask (black matrix) 32 and the color filter layer 33 are formed on a color filter glass substrate 31 (shown in FIG. 7). Here, the components which are the same or similar to that in the first to fourth embodiments are denoted by the same reference numbers and the explanation of which is omitted.

Figure 29:
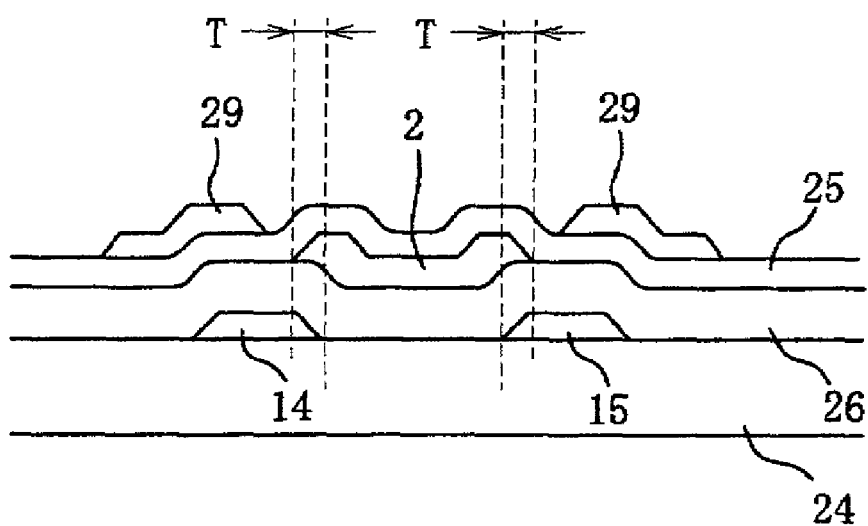
FIG. 29 is a cross sectional view showing an example of structure of a video signal line and the common electrodes in the transverse electric field type liquid crystal display panel in the fifth embodiment of the present invention.

FIG. 29 is a cross sectional diagram showing a structure of the video signal line and the common electrodes of the liquid crystal panel in the active matrix type liquid crystal display device in the fifth embodiment. In this cross sectional view, the common electrode 14 and the common electrode 15 are formed on the same surface of the active matrix glass substrate 24 at a predetermined distance. The gate insulation layer 26 is laminated on the common electrodes 14 and 15 (upper part of the cross section) in order to secure the insulation in the upward direction. The video signal line 2 is formed on the gate insulation layer 26 at about the middle position between the common electrodes 14 and 15. Further, the passivation layer 25 which is an insulation film, as well as transparent electrode 29, respectively, are formed on the video signal line 2.

Here, the video signal line 2 is formed in such a way that a part of the video signal line overlaps the common electrode 14 and the common electrode 15 (with an overlapping length T). In other words, the video signal line 2 has a width larger than the space between the common electrode 14 and the common electrode 15. The overlapping length T is about 2 $\mu$m (micrometer).

By overlapping the video signal line 2 and the common electrodes 14 and 15 in this manner while securing the insulation by the gate insulation layer 26, the light will not leak through both sides of the video signal line 2. Therefore, the black mask 32 shown in FIG. 3, which is located between two color filter elements and is facing the video signal line 2, becomes unnecessary. This allows only the color filter layer 33 to be bent along with the video signal line 2 as shown in FIG. 24. There is no limits in the number of bents.

Embodiment 6

Figure 27:
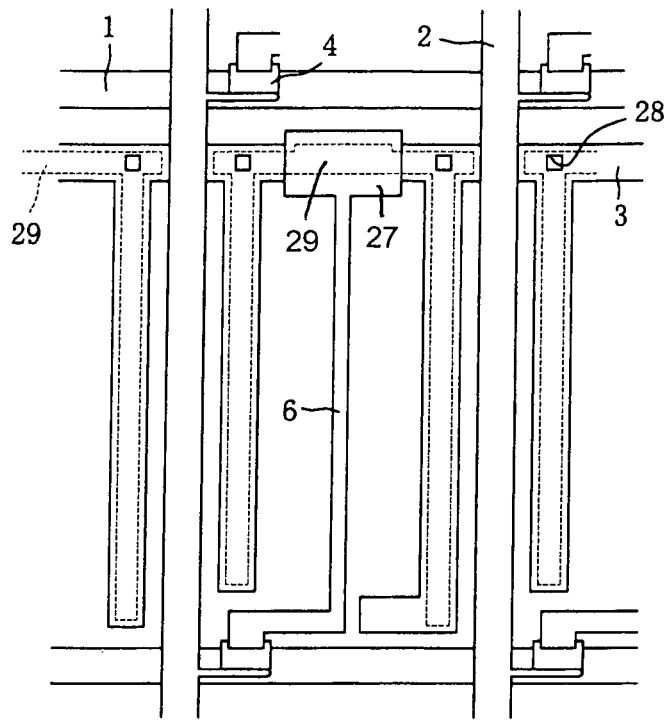
FIG. 27 is a plan view showing an example of structure in the transverse electric field type liquid crystal display panel in the sixth embodiment of the present invention.
Figure 28:
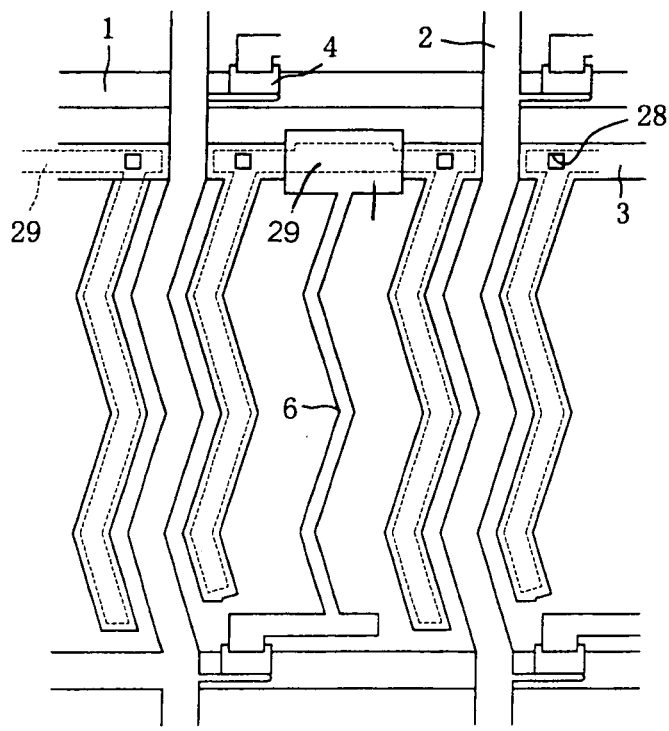
FIG. 28 is a plan view showing another example of structure in the transverse electric field type liquid crystal display panel in the sixth embodiment of the present invention.

FIGS. 27 and 28 are plan views of the liquid crystal display device in the sixth embodiment of the present invention. In this example, the method of forming the hold capacitor in the first embodiment of the present invention (shown in FIG. 11) is applied to the conventional liquid crystal display panel in the transverse electric field system. Here, the components which are the same or similar to the first to fifth embodiments are denoted by the same reference numbers and the explanation of which is omitted.

In FIG. 27, an example of the liquid crystal panel in the transverse electric field system is illustrated where the comb-like common electrode 3 is formed in a straight shape. In FIG. 28, an example of the liquid crystal panel in the transverse electric field system is illustrated where the comb-like common electrode 3, the liquid crystal drive electrodes 6, and the video signal line 2 are bent with predetermined angles. There is only one common electrode 3 provided in each pixel in FIGS. 27 and 28. The gate insulation layer 26 (shown in FIG. 10) is provided on the common electrode 3, and a transparent electrode 29 connected to the common electrode 3 through the contact hole 28 is provided on the gate insulation layer 26.

FIG. 10 shows the cross sectional view of the hold capacitor in the conventional liquid crystal panel. As explained above, in the cross sectional view, the scanning line 1 and the common electrode 3 are formed on the same surface of the active matrix glass substrate 24 at a predetermined distance. The gate insulation layer 26 is laminated on the common electrode 3 (upper part of cross section) in order to secure the insulation of the scanning line 1 and the common electrode 3 in the upward direction. The liquid crystal drive electrode 27 (part of the liquid crystal drive electrode 6) is formed on the gate insulation layer 26 at the position corresponding to the common electrode 3. Thus, the hold capacitor 5 (shown in FIG. 1) is created by sandwiching the gate insulation layer 26 by the common electrode 3 and the liquid crystal drive electrode 27.

When using the hold capacitor formation method of the present invention, the transparent electrode 29 can be formed in the same position as the liquid crystal drive electrode 27 right above the passivation layer 25 (as shown in FIG. 13). In other words, the two electrodes 3 and 29 are established (facing each other) on the top and bottom of the liquid crystal drive electrode 27 (part of the liquid crystal drive electrodes 6) with the insulation material therebetween (thereby forming two capacitors). Hence, the hold capacitor with a capacitance value about two times larger than the conventional hold capacitor can be formed.

Figure 9:
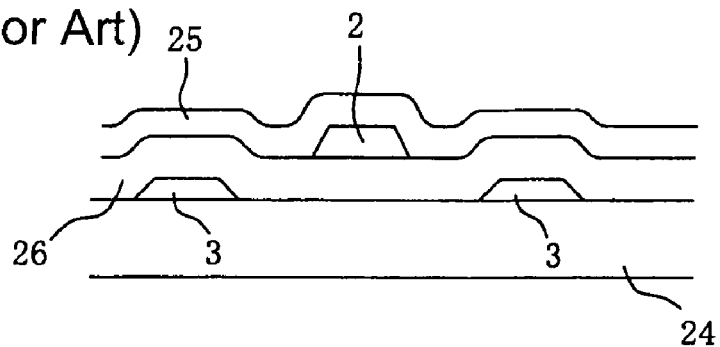
FIG. 9 is a cross sectional view showing a structure of a video signal line and a common electrode in the transverse electric field type liquid crystal display panel in the conventional technology.

The video signal line 2 and the common electrode 3 in the conventional method are structured in a manner shown in the cross sectional view of FIG. 9. However, when applying the present invention, the cross sectional view is now configured as shown in FIG. 12 (the common electrodes 14 and 15 in FIG. 12 correspond to the common electrode 3). In other words, the structure in the present invention allows the electric field of the video signal line 2 to be easily shielded, thereby preventing the generation of cross talks from the video signal line 2.

Embodiment 7

Figure 20:
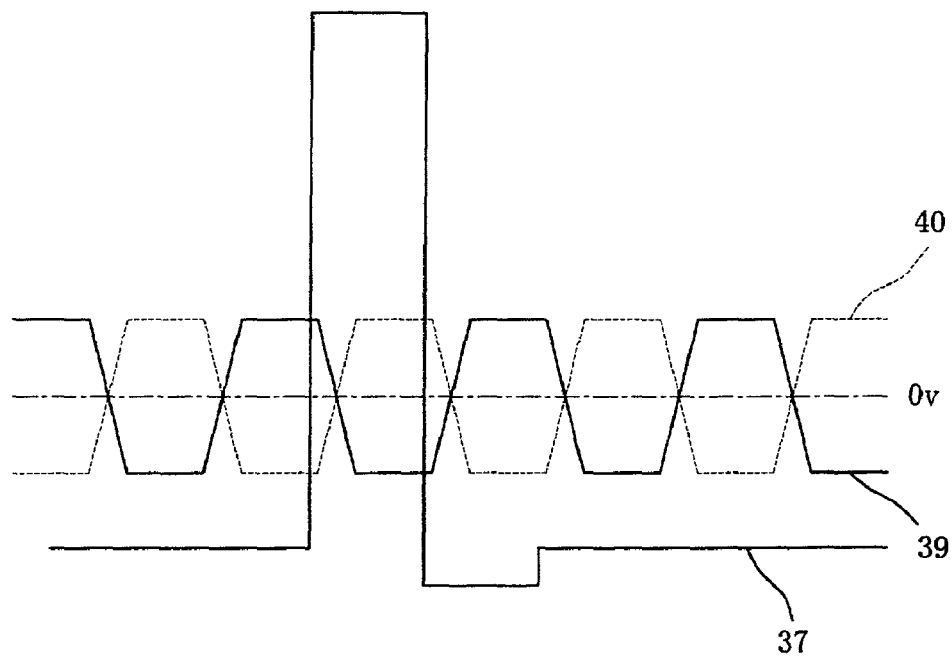
FIG. 20 is a diagram showing drive signal waveforms applied to the scanning lines and the common electrodes in the transverse electric field type liquid crystal display panel in the seventh embodiment of the present invention.
Figure 21:
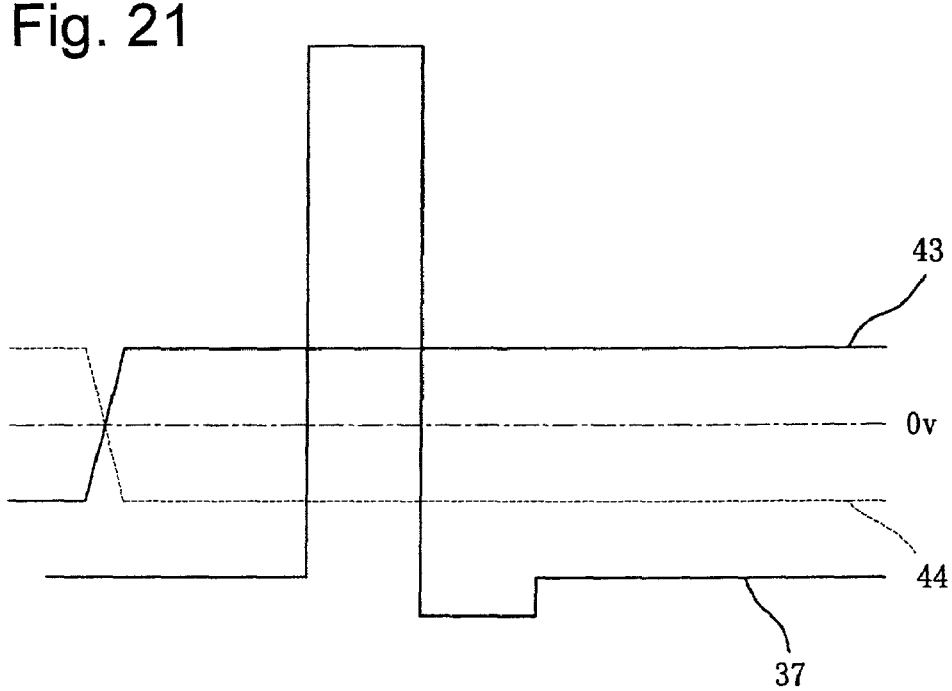
FIG. 21 is a diagram showing drive signal waveforms applied to the scanning lines and the common electrodes in the transverse electric field type liquid crystal display panel in the seventh embodiment of the present invention.

FIGS. 20 and 21 show the seventh embodiment of the liquid crystal display device of the present invention. FIG. 20 is a diagram showing a drive signal waveform applied to the scanning lines 10, 11 and the common electrodes 12–15 (such as in FIGS. 3 and 4), or the common electrodes 19–22 (such as in FIGS. 5 and 6) of the liquid crystal display panel in the transverse electric field system. Similar to the drive signal waveform shown in FIG. 17 with respect to the first embodiment, the drive signals applied to the common electrodes change the polarities at every horizontal scanning period.

FIG. 21 is a diagram showing a drive signal waveform applied to the scanning lines 10, 11 and the common electrodes 12–15 (such as in FIGS. 3 and 4), or the common electrodes 19–22 (such as in FIGS. 5 and 6) of the liquid crystal display panel in the transverse electric field system. Similar to the drive signal waveform shown in FIG. 18 with respect to the first embodiment, the drive signals applied to the common electrodes change the polarities at every vertical scanning period. Here, the components which are the same or similar to the first to sixth embodiments are denoted by the same reference numbers and the explanation of which is omitted.

Figure 7:
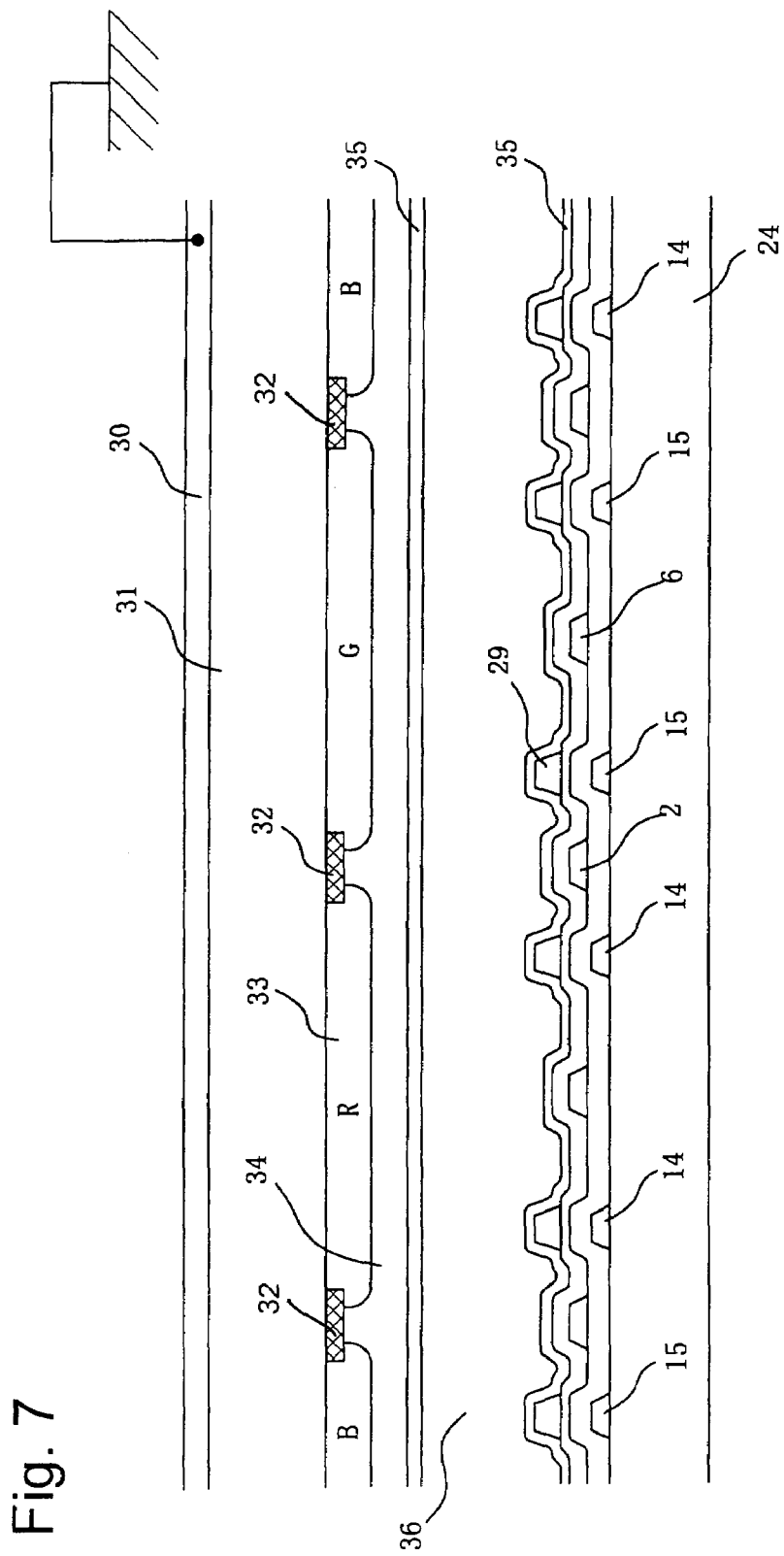
FIG. 7 is a cross sectional view showing an example of structure in the transverse electric field type liquid crystal display panel in the fifth embodiment of the present invention having two common electrodes within each pixel.

Here, the cross sectional structure of the active matrix type liquid crystal display device in the transverse electric field system is shown in the cross sectional view of FIG. 7. In this example, the color filter layer 33 and the black mask (black matrix) 32 are provided on the color filter glass substrate 31. On the color filter layer 33 and the black mask 32, a leveling protective layer 34 and a liquid crystal molecule alignment layer 35 are respectively formed. The back side of the color filter glass substrate 31 is provided with a transparent conductive layer 30 to countermeasure the static electricity. The transparent conductive layer 30 is connected to the ground.

The front surface of the color filter glass substrate 31 faces the active matrix glass substrate 24, and a liquid crystal layer 36 is held between the two substrates. Further, the video signal line 2, the common electrodes 14 and 15, the transparent electrode 29, and the liquid crystal drive electrode 6 are respectively formed on the surface of the active matrix glass substrate 24 on the side facing the color filter glass substrate 31.

When an average electric potential of the waveform supplied to the video signal line 2, the common electrodes 14 and 15, or the liquid crystal drive electrodes 6 are significantly different from the ground potential, an electric field will be created between these electrodes and the transparent conductive layer 30 on the back side of the color filter glass substrate 31, and thus, ionic material will be transferred to the liquid crystal layer 36. When using the liquid crystal panel for a long period of time, residual images will arise because of the ionic material transfer, resulting in significant deterioration of the display quality.

Therefore, the present invention shown in FIGS. 20 and 21 is designed to prevent such a problem. By setting the average voltage value of the drive signals for the common electrodes to be close to the ground potential such as 0–1V, the transfer of ionic material can be effectively prevented. The average voltage here means a combined voltage of the voltage waveform 39 of the top common electrode and the voltage waveform 40 of the bottom common electrode in FIG. 20, or a combined voltage of the voltage waveform 43 of the top common electrode and the voltage waveform 44 of the bottom common electrode in FIG. 21. Since the voltage waveforms are symmetrical to one another with respect to 0V, the average voltage can be easily controlled to be close to the ground potential.

An average voltage of the video drive signal 37 for the video signal line is preferably set to a voltage value slightly more positive than the ground potential upon consideration of the changes caused by capacitive coupling arises at rising and falling edges of the signal on the scanning line. When such a positive value is set to about +1V, no problems will arise in the operation of the liquid crystal display device.

In the active matrix type liquid crystal display devices of the present invention, a large DC voltage will not be applied between the pixel electrode and the transparent conductive electrode on the color filter substrate facing the active matrix substrate, as well as between the common electrodes and video signal line. Thus, the ionic material will not elude from the color filter substrate, achieving a liquid crystal panel with high reliability. Further, because it is able to suppress the uneven migration of the ionic material, display unevenness will no longer be generated, achieving a liquid crystal display device with high display quality and reliability.

Embodiment 8

Figure 30:
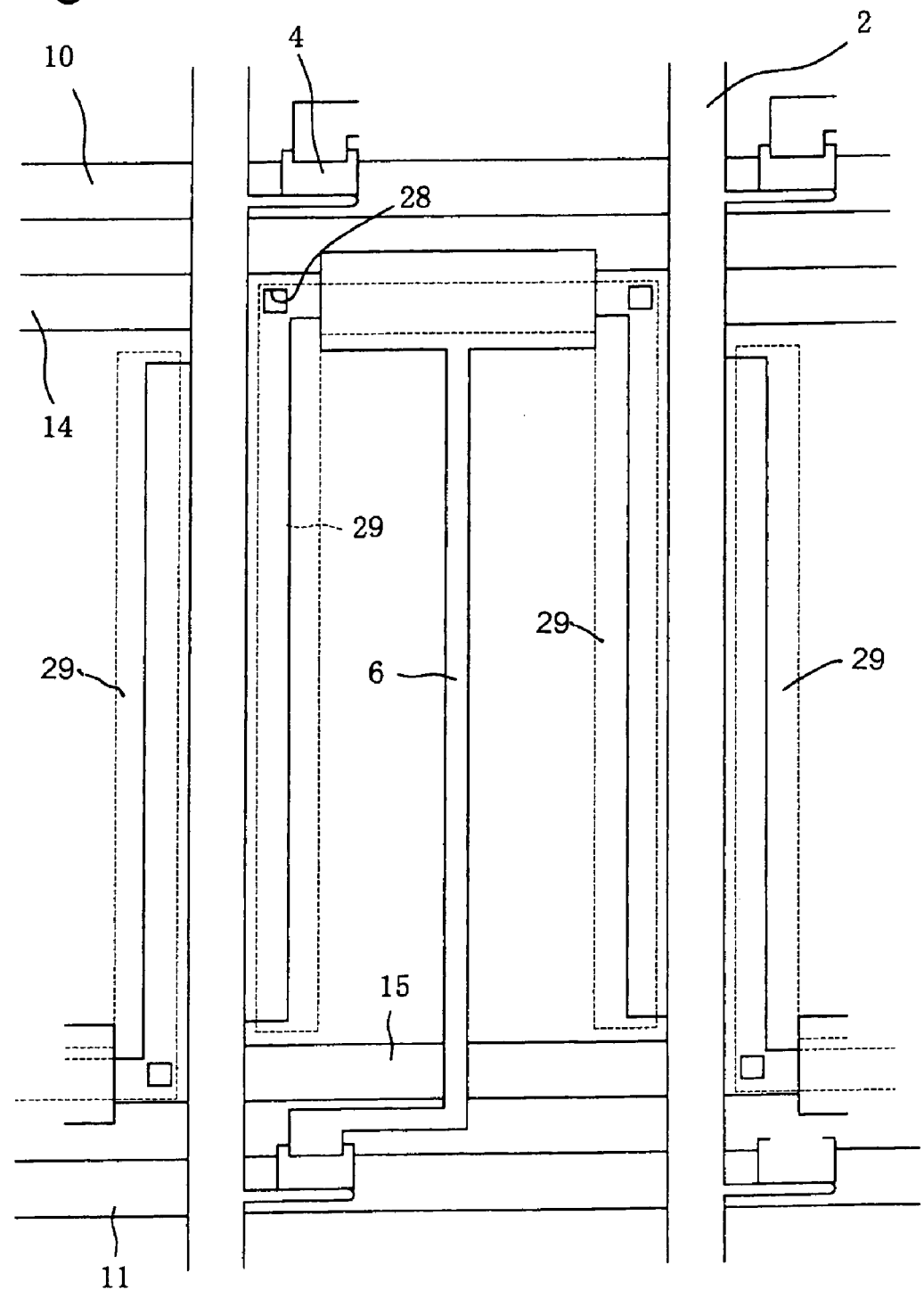
FIG. 30 is a plan view showing an example of structure in the transverse electric field type liquid crystal display panel in the eighth embodiment of the present invention.
Figure 31:
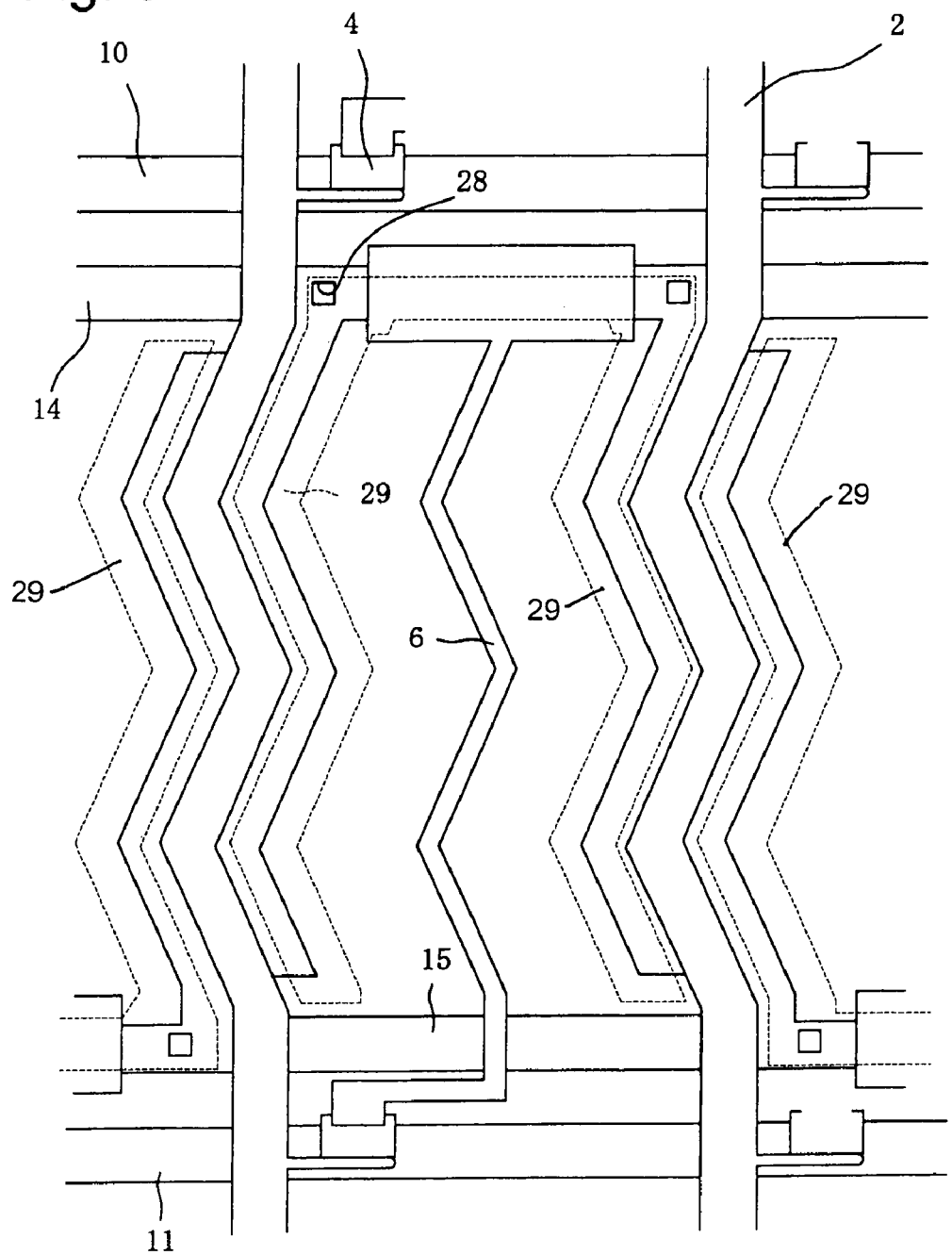
FIG. 31 is a plan view showing another example of structure in the transverse electric field type liquid crystal panel in the eighth embodiment of the present invention.
Figure 32:
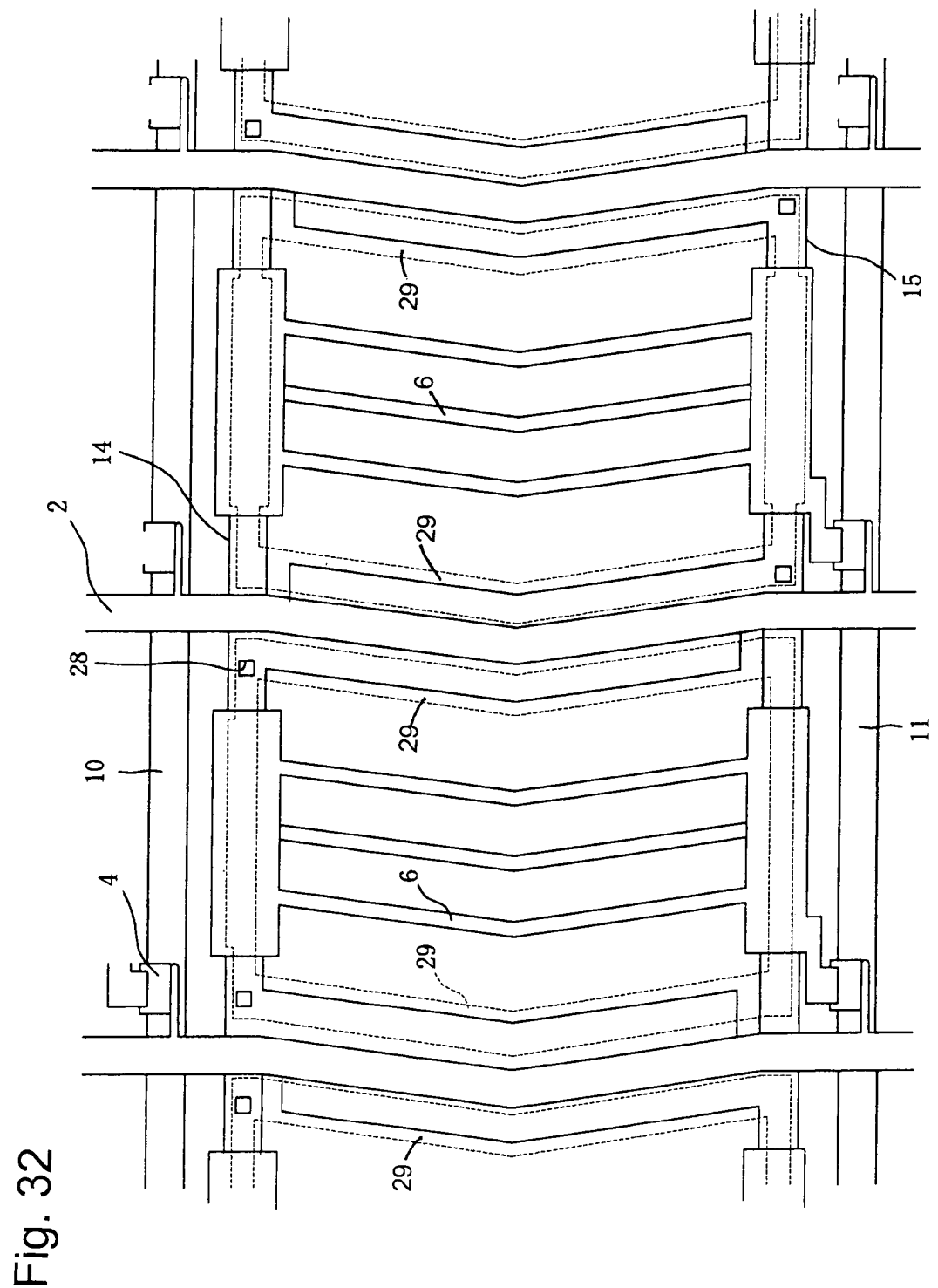
FIG. 32 is a plan view showing a further example of structure in the transverse electric field type liquid crystal display panel in the eighth embodiment of the present invention.

FIGS. 30, 31 and 32 show the liquid crystal display device in the eighth embodiment of the present invention. The cross sectional structure of the video signal line 2 and the common electrodes 14 and 15 in the eighth embodiment is similar to the structure shown in the cross sectional view of the video signal line and common electrodes of the liquid crystal display device in the fifth embodiment (FIG. 29), where the video signal line 2 is surrounded by the common electrodes 14, 15 and 29 located on the top, bottom and the right and left sides.

In the eighth embodiment, as shown in FIGS. 30, 31 and 32, the transparent electrode (common electrode) 29 is made wider than the common electrodes 14 and 15 below so that it projects toward the liquid crystal drive electrode 6. Because of this structure, the light transmission can be increased while completely shielding the electric field of the video signal line 2, achieving a good and bright image without any horizontal or vertical cross talks.

As described in the foregoing, according to the present invention, the distance between the common electrodes and liquid crystal drive electrodes can be increased without increasing the signal amplitude of the video signal line, thereby improving the aperture ratio. In addition, by shielding the video signal line, the vertical cross talks can be reduced. By bending the video signal line, the pixel electrodes, the black mask, and the color filter layer relative to the alignment direction of the liquid crystal, the color shift can be prevented without decreasing the aperture ratio, thereby achieving a beautiful video image at any angle. Further, by using the drive method of the present invention, a highly reliable liquid crystal display device without causing any residual images can be realized.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. An active matrix type liquid crystal display device in a transverse electric field system comprising:
    a video signal line for supplying a drive signal to a liquid crystal drive electrode that drives a liquid crystal in a pixel;
    a scanning line aligned to cross the video signal line, where the video signal line and the scanning line are aligned in a matrix manner; and
    two common electrodes running in parallel with one another;
    wherein the pixels are aligned in a matrix manner corresponding to the matrix formed by the video signal line and the scanning line and each pixel includes the two common electrodes and the liquid crystal drive electrode connected to the video signal line;
    wherein one of the common electrodes is established adjacent to the scanning line and the two common electrodes are separated by a predetermined distance, and either one of the two common electrodes is established in parallel with the liquid crystal drive electrode; and
    wherein the two common electrodes are electrically separated from one another and respectively provided with different voltages.

2. An active matrix type liquid crystal display device as defined in claim 1, wherein the voltages supplied to the two common electrodes are alternately switched with one another between two voltage levels of opposite polarity at every horizontal scanning period or vertical scanning period.

3. An active matrix type liquid crystal display device as defined in claim 2, wherein an average voltage of the voltages supplied to the common electrodes or an average voltage of the signal amplitude supplied to the video signal line is substantially equal to an earth voltage or to a positive voltage slightly higher than the earth voltage.

4. An active matrix type liquid crystal display device as defined in claim 1, wherein each of the two common electrodes is established along both sides of the scanning line where the voltages of the two common electrodes are different from one another;
    wherein the two different voltages of opposite polarity are switched with one another between the two common electrodes at every cycle of a horizontal scanning period or a vertical scanning period.

5. An active matrix type liquid crystal display device as defined in claim 1, wherein the common electrodes are extended along the scanning line and are diverted perpendicularly relative to an alignment direction of said scanning line and are formed in parallel with the liquid crystal drive electrodes;

wherein the diverted common electrodes are respectively connected to the two electrically separated common electrodes and an element of the diverted common electrodes nearest to the video signal line at one side thereof and an element of the diverted common electrodes nearest to the video signal line at another side thereof are provided with different voltages from one another.

6. An active matrix type liquid crystal display device as defined in claim 1, wherein the liquid crystal drive electrode and the common electrodes established in parallel with the liquid crystal drive electrode are bent in a zigzag manner within a unit pixel one or more times with two intersecting angles per bent;

wherein one intersecting angle is in a range between +1° and +30° relative to an alignment direction of the liquid crystal and another intersecting angle is in a range between −1° and −30° relative to the alignment direction of the liquid crystal.

7. An active matrix type liquid crystal display device as defined in claim 6, wherein the video signal line is in a zigzag manner within the unit pixel one or more times with two intersecting angles per bent;

wherein one intersecting angle is in a range between +1° and +30° relative to the alignment direction of the liquid crystal and another intersecting angle is in a range between −1° and −30° relative to the alignment direction of the liquid crystal; and wherein the liquid crystal display device further includes at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

8. An active matrix type liquid crystal display device as defined in claim 1, wherein the liquid crystal drive electrode and the common electrodes established in parallel with the liquid crystal drive electrode are bent in a zigzag manner within a unit pixel one or more times with two intersecting angles per bent;

wherein one intersecting angle is in a range between +60° and +89° relative to an alignment direction of the liquid crystal and another intersecting angle is in a range between −60° and −89° relative to the alignment direction of the liquid crystal.

9. An active matrix type liquid crystal display device as defined in claim 8, wherein the video signal line is bent in a zigzag manner within the unit pixel one or more times with two intersecting angles per bent;

wherein one intersecting angle is in a range between +60° and +89° relative to the alignment direction of the liquid crystal and another intersecting angle is in a range between −60° and −89° relative to the alignment direction of the liquid crystal; and wherein the liquid crystal display device further includes at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

10. An active matrix type liquid crystal display device as defined in claim 1, further comprising a gate insulation layer for insulating the common electrodes and the liquid crystal drive electrode within a unit pixel;

wherein one of the two common electrodes and the liquid crystal drive electrode are insulated from one another by the gate insulation layer while forming a hold capacitor for temporarily holding a voltage by partially overlapping with one another having the gate insulation layer therebetween.

11. An active matrix type liquid crystal display device as defined in claim 10, further comprising a passivation layer for insulating the liquid crystal drive electrode and the common electrodes in combination with the gate insulation layer;

wherein the common electrodes are formed of two parallel electrodes one of which is positioned above another at a predetermined vertical distance; and wherein the liquid crystal drive electrode insulated by the passivation layer and the gate insulation layer are sandwiched between the two parallel electrodes.

12. An active matrix type liquid crystal display device as defined in claim 11, wherein the passivation layer and the gate insulation layer are sandwiched between the two parallel electrodes forming the common electrodes; and wherein the common electrodes are established on both sides of the video signal line.

13. An active matrix type liquid crystal display device as defined in claim 12, wherein the common electrodes having the two parallel electrodes at the predetermined vertical distance for sandwiching the passivation layer and the gate insulation layer therebetween, and the liquid crystal drive electrode are bent in a zigzag manner within a unit pixel one or more times with two intersecting angles per bent;

wherein one intersecting angle is in a range between +60° and +89° relative to the alignment direction of the liquid crystal and another intersecting angle is in a range between −60° and −89° relative to the alignment direction of the liquid crystal.

14. An active matrix type liquid crystal display device as defined in claim 13, wherein the video signal line is bent in a zigzag manner within the unit pixel one or more times with two intersecting angles per bent;

wherein one intersecting angle is in a range between +60° and +89° relative to the alignment direction of the liquid crystal and another intersecting angle is in a range between −60° and −89° relative to the alignment direction of the liquid crystal; and wherein the liquid crystal display device further includes at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

15. An active matrix type liquid crystal display device as defined in claim 12, wherein the common electrodes having the two parallel electrodes at the predetermined vertical distance for sandwiching the passivation layer and the gate insulation layer therebetween, and the liquid crystal drive electrode are bent in a zigzag manner within a unit pixel one or more times with two intersecting angles per bent;

wherein one intersecting angle is in a range between +1° and +30° relative to the alignment direction of the liquid crystal and another intersecting angle is in a range between −1° and −30° relative to the alignment direction of the liquid crystal.

16. An active matrix type liquid crystal display device as defined in claim 15, wherein the video signal line is bent in a zigzag manner within the unit pixel one or more times with two intersecting angles per bent;

wherein one intersecting angle is in a range between +1° and +30° relative to the alignment direction of the liquid crystal and another intersecting angle is in a range between −1° and −30° relative to the alignment direction of the liquid crystal; and wherein the liquid crystal display device further includes at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

17. An active matrix type liquid crystal display device as defined in claim 1, further comprising a gate insulation layer for insulating the common electrodes and the liquid crystal drive electrode within the unit pixel;

wherein the two common electrodes and the liquid crystal drive electrode are insulated from one another by the gate insulation layer while forming two hold capacitor within the unit pixel by partially overlapping with one another having the gate insulation layer therebetween.

18. An active matrix type liquid crystal display device as defined in claim 17, further comprising a passivation layer for insulating the liquid crystal drive electrode and the common electrodes in combination with the gate insulation layer;

wherein the common electrodes include two parallel electrodes one of which is positioned above another at a predetermined vertical distance; and wherein the liquid crystal drive electrode insulated by the passivation layer and the gate insulation layer are sandwiched between the two parallel electrodes.

19. An active matrix type liquid crystal display device as defined in claim 18, wherein the passivation layer and the gate insulation layer are sandwiched between the two parallel electrodes forming the common electrodes; and wherein the common electrodes are established on both sides of the video signal line.

20. An active matrix type liquid crystal display device as defined in claim 19, wherein the common electrodes having the two parallel electrodes at the predetermined vertical distance for sandwiching the passivation layer and the gate insulation layer between and the liquid crystal drive electrode are bent in a zigzag manner within the unit pixel one or more times with two intersecting angles per bent;

wherein one intersecting angle is in a range between +1° and +30° relative to the alignment direction of the liquid crystal and another intersecting angle is in a range between −1° and −30° relative to the alignment direction of the liquid crystal.

21. An active matrix type liquid crystal display device as defined in claim 20, wherein the video signal line is bent in a zigzag manner within the unit pixel one or more times with two intersecting angles per bent;

wherein one intersecting angle is in a range between +1° and +30° relative to the alignment direction of the liquid crystal and another intersecting angle is in a range between −1° and −30° relative to the alignment direction of the liquid crystal; and wherein the liquid crystal display device further includes at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

22. An active matrix type liquid crystal display device as defined in claim 19, wherein the common electrodes having the two parallel electrodes at the predetermined vertical distance for sandwiching the passivation layer and the gate insulation layer between and the liquid crystal drive electrode are bent in a zigzag manner within the unit pixel one or more times with two intersecting angles per bent;

wherein one intersecting angle is in a range between +60° and +89° relative to the alignment direction of the liquid crystal and another intersecting angle is in a range between −60° and −89° relative to the alignment direction of the liquid crystal.

23. An active matrix type liquid crystal display device as defined in claim 22, wherein the video signal line is bent in a zigzag manner within the unit pixel one or more times with two intersecting angles per bent;

wherein one intersecting angle is in a range between +60° and +89° relative to the alignment direction of the liquid crystal and another intersecting angle is in a range between −60° and −89° relative to the alignment direction of the liquid crystal; and wherein the liquid crystal display device further includes at least one of a black mask and a color filter where the black mask is bent in a zigzag manner with an intersecting angle identical to the intersecting angle of the video signal line and the color filter is bent in a zigzag manner with an intersecting angle identical to the intersecting angle of the video signal line.

* * * * *